April 28, 1970 T. H. ENGLE 3,508,794
HYDRAULIC BRAKE CIRCUITS
Filed May 6, 1968 8 Sheets-Sheet 2

INVENTOR
THOMAS H. ENGLE
BY Dodge and Sons
ATTORNEYS

April 28, 1970   T. H. ENGLE   3,508,794
HYDRAULIC BRAKE CIRCUITS

Filed May 6, 1968   8 Sheets-Sheet 3

INVENTOR
THOMAS H. ENGLE

BY Dodge and Sons

ATTORNEYS

April 28, 1970  T. H. ENGLE  3,508,794
HYDRAULIC BRAKE CIRCUITS

Filed May 6, 1968

*INVENTOR*
THOMAS H. ENGLE

BY  Dodge and Sons

*ATTORNEYS*

April 28, 1970 T. H. ENGLE 3,508,794
HYDRAULIC BRAKE CIRCUITS
Filed May 6, 1968 8 Sheets-Sheet 8

INVENTOR
THOMAS H. ENGLE
BY Dodge and Sons
ATTORNEYS

United States Patent Office 3,508,794
Patented Apr. 28, 1970

3,508,794
HYDRAULIC BRAKE CIRCUITS
Thomas H. Engle, Cape Vincent, N.Y., assignor to General Signal Corporation, a corporation of New York
Filed May 6, 1968, Ser. No. 726,766
Int. Cl. B60t 17/16, 7/10
U.S. Cl. 303—10                                    53 Claims

ABSTRACT OF THE DISCLOSURE

Hydraulic hand brake circuits for railroad cars including a reversible pump of either the fixed displacement or variable displacement, pressure compensated type which is driven by a handwheel through a step-up gear train, and a brake cylinder equipped with a lock and a detent device which is overpowered by a lock or an unlock motor depending upon whether the brake is being applied or released. Valving mechanism automatically utilizes the output of the pump to apply and lock the brake when the pump is operated in one sense, and to release the brake and the lock when the pump is operated in the opposite sense. A visual indicator operated by pressures within the circuit may be included to show the condition of the brake lock, and it can include mechanism for minimizing the risk of a premature indication of lock release. A pump unloading valve may also be used to provide a "feel" indicative of brake release. The hydraulic cylinder of the hand brake may also serve a service braking system, and in these installations the number of lines required to transmit fluid to and from the brake cylinder and the lock-controlling motors may vary from one to three depending on which of several types of valving mechanism is employed. Certain of the combined hand brake-service brake circuits include slack compensators and permit use of the hand brake on all wheels of a car.

BACKGROUND AND SUMMARY OF THE INVENTION

At the present time, the hand brakes used on railroad freight cars are of the mechanical type. These brakes consist of a chain which is connected with the end of the live cylinder lever and is wound on a drum that is rotated by a crewman through a handwheel. As the chain is wound onto the drum, it pulls the push rod from the pneumatic brake cylinder and forces the shoes against the wheels. As long as the chain can exert a force at the push rod equal to that developed by the brake cylinder, this scheme provides a fully effective hand brake at minium cost because the rods and levers forming the remainder of the force paths to the shoes also serve as part of the pneumatic brake system. Moreover, if the mechanical efficiency of the pneumatic brake is satisfactory, so too is the efficiency of the hand brake. However, with the advent of large, heavy cars, such as the General Electric Company's 500 ton depressed center flatcar which employs four four-wheel trucks (i.e., a total of eight axles) at each end, the mechanical hand brake is no longer practical because of difficult, if not insoluble, problems of installation and of insuring adequate braking force.

The object of this invention is to provide a practical hydraulic hand brake which is compatible with existing equipment, and which overcomes the installation and brake force problems encountered with the conventional mechanical hand brake. The improved hand brake is characterized by the following essential features:

(1) It differs as little as possible in appearance and mode of operation from the standard mechanical hand brake and thus obviates special crew education and minimizes operator errors.

(2) The hand brake circuit can be used in conjunction with an entirely separate service braking circuit, or the two can be combined so that a single hydraulic brake cylinder or set of cylinders can serve both circuits. In either case, application and release of the service brake will not result in release of the hand brake. This feature allows the service brake to be operated while the car is on a grade.

(3) The hand brake includes a mechanical lock which holds the brake in application position even though the brake-applying pressure dissipates as a result of leakage. This feature is important because of the practical impossibility of maintaining a closed hydraulic circuit at high pressure throughout the long periods when the car is in storage or is being loaded or unloaded.

In addition to the foregoing essential features, the invention provides optional, though desirable, secondary features. Among these are a detent for yieldingly holding the lock in its locking and unlocking positions, a pump unloading device which provides the operator with a "feel" reaction indicative of brake release, and an automatic, pressure-operated indicator which displays the conditions of the lock. In this connection, the invention may also include mechanism for insuring against a premature indication that the brake is unlocked. Other optional features include use of a variable displacement, pressure compensated pump to reduce the number of revolutions of the handwheel required to apply the brake, and the inclusion of a step-up gear train between the handwheel and the pump which allows use of inexpensive pumps having relatively high rates of internal leakage.

As mentioned above, the hydraulic cylinder or cylinders of the hand brake may also serve the car's main or service braking system. The preferred hand brake accommodates this additional function using three lines or conduits leading from the control station to each braking station, but the invention also encompasses somewhat more complex schemes which perform the same functions using either one or two less control lines. In some of these embodiments, the hand brake includes a slack compenesator and may be applied to all of the car's wheels.

BRIEF DESCRIPTION OF THE DRAWINGS

Several embodiments of the invention are described herein in detail with reference to the accompanying drawings in which:

FIG. 15 is a schematic diagram similar to FIGS. 11–14 showing the preferred scheme for combining the hand brake and service brake circuits.

Figure 16:
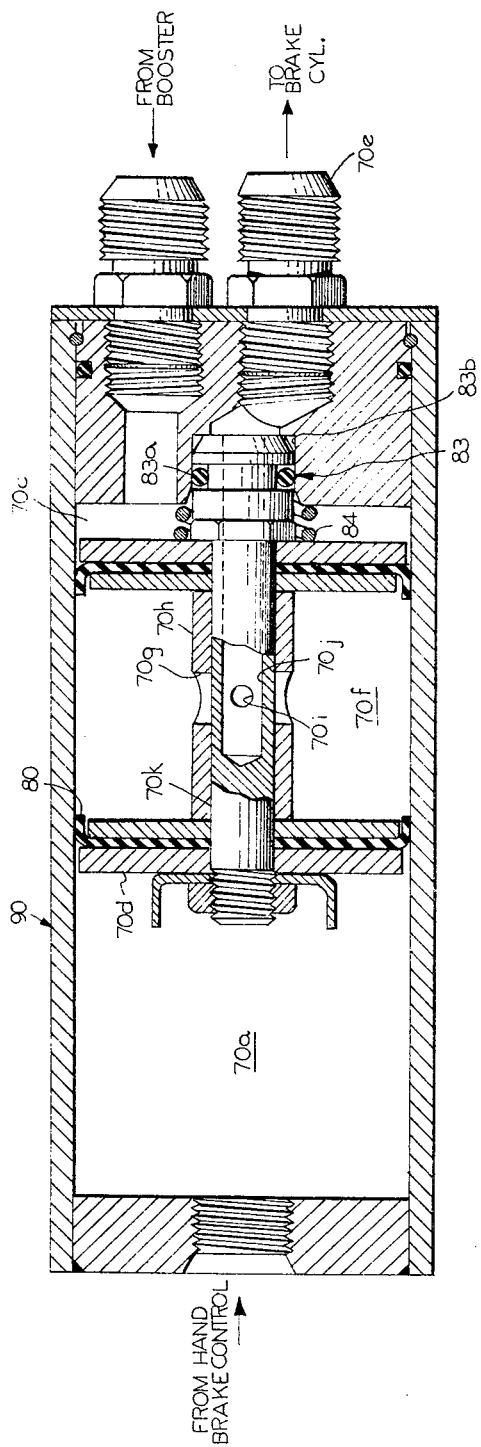
Figure 15:
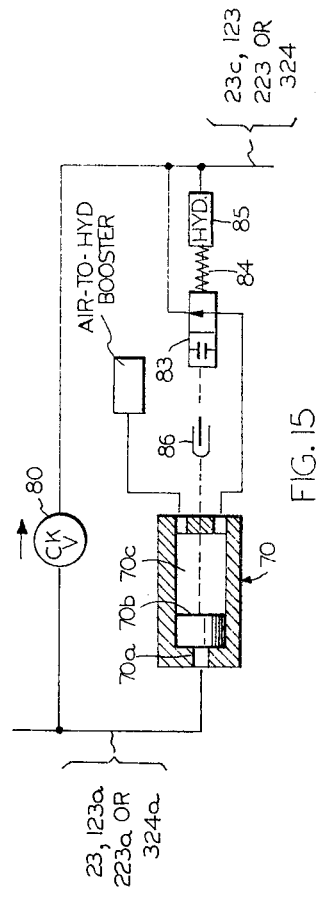

FIG. 16 is a sectional view of the actual slack compensating and valving device depicted schematically in FIG. 15.

DESCRIPTION OF ILLUSTRATED EMBODIMENTS

Figure 1:
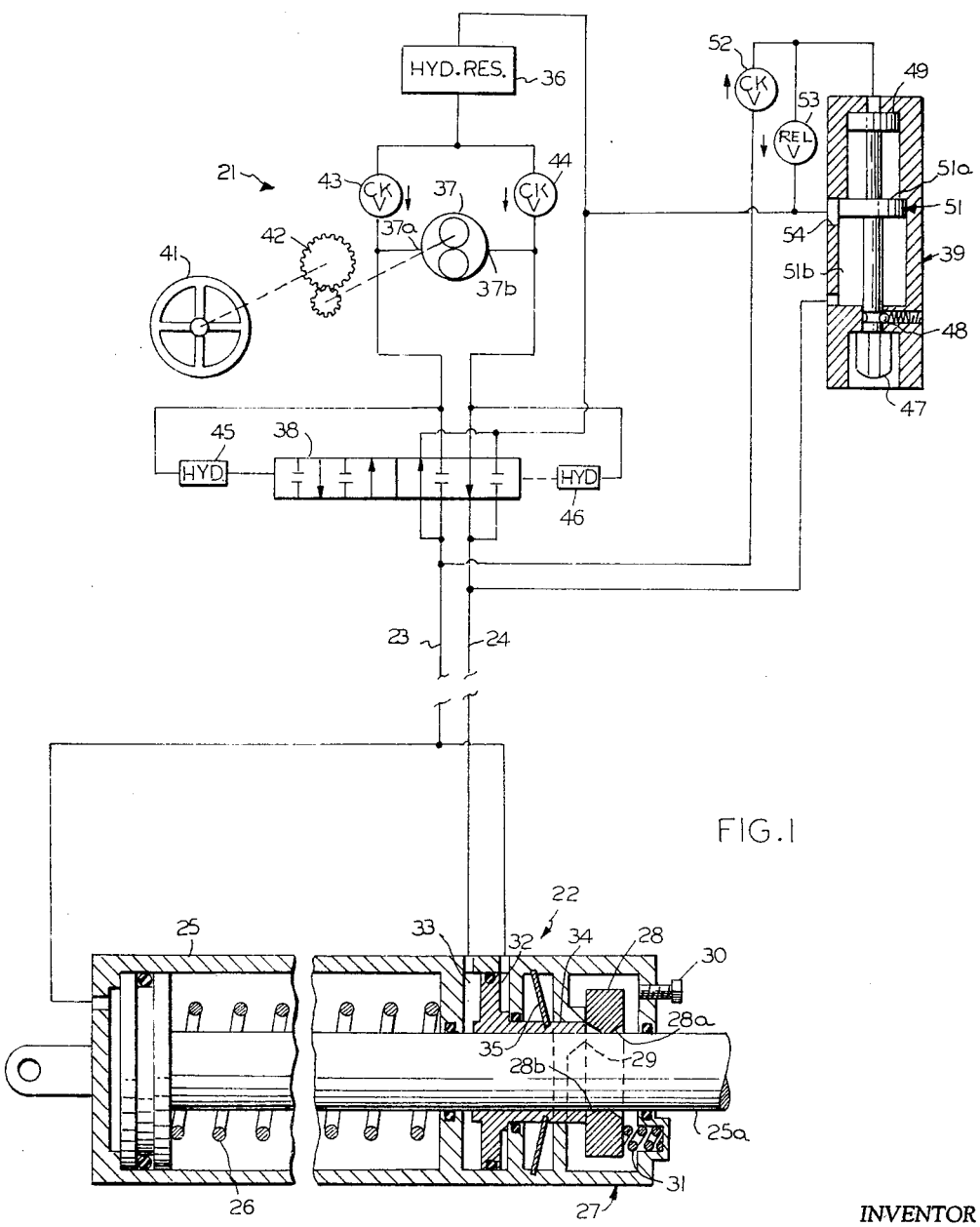
FIG. 1 is a schematic diagram of the preferred hand brake circuit.

(A) FIG. 1 embodiment

The preferred hand brake circuit is shown in FIG. 1 and comprises a single control station 21 located so as to be accessible to the crewmen, one or more braking stations 22, and a pair of interconnecting fluid conduits or lines 23 and 24 which are selectively and reversely pressurized and vented at the control station. Each car truck may be equipped with one or more braking stations 22 depending upon the type of brake being used, but in the usual case the hand brake would be applied only to one-half of the wheels. In any event, if the car has a plurality of braking stations, all of the stations are connected with a single pair of lines 23 and 24 and are controlled at station 21.

The braking station 22 includes a single-acting brake cylinder 25 which may or may not be equipped with a return spring 26, depending upon the design of the brake rigging, and which, in either case, includes a mechanical lock 27 that holds the brake in application position. On a car equipped with standard NYCOPAK brake assemblies, only one station 22 is used per truck; the cylinder 25 being connected between the beams in place of the normal bottom rod and the top rods being anchored to the bolster or the car body. Although various forms of mechanical cylinder locks 27 may be employed, the canting ring type of lock shown in the drawing is preferred. This lock includes a ring 28 which encircles the piston rod 25a and is arranged to pivot about a fulcrum point 29 between the illustrated unlock position, in which it is normal to and permits substantially free motion of the piston rod, and a canted, locking position, in which the oblique corners defined by its flared inner peripheral surfaces 28a and 28b frictionally bind the piston rod and prevent its retraction. Lock ring 28 is biased toward the locking position by a spring 31 and is actuated by a pair of opposed fluid pressure motors 32 and 33 which act on it through a sleeve member 34. The resistance to flow of oil into and out of motors 32 and 33 and the friction of the movable motor parts tends inherently to maintain lock ring 28 in each of its two positions. However, more positive insurance against inadvertent application or release of the lock is provided by including a detent. In FIG. 1, the detent 35 takes the form of a Belleville spring whose inner and outer peripheries are hold captive in member 34 and in the casing which encloses lock mechanism 27. Lock motor 32 and brake cylinder 25 are connected with line 23 so that, when this line is pressurized and line 24 is vented, cylinder 25 will apply the brake, motor 32 will overpower the detent 35 and retract member 34, and spring 31 will tilt lock ring 28 to the locking position. Unlock motor 33 is connected with the other line 24; therefore, when this line is pressurized and line 23 is vented, motor 33 overcomes the binding force between ring 28 and rod 25a and causes member 34 to push the ring to its unlocking position, and brake cylinder 25 is allowed to retract. In cases where damage to or malfunction of the hydraulic circuit precludes unlock motor 33 from performing its intended function, the hand brake lock can be released by turning emergency release screw 30 in a direction that causes it to push ring 28 to the upright position.

Control station 21 comprises a hydraulic reservoir 36, a reversible, fixed displacement gear pump 37, a shuttle valve 38, and a combined valving and indicator unit 39. Pump 37 includes a pair of ports 37a and 37b, each of which serves alternately as the inlet and discharge port, and it is driven by a standard AAR handwheel 41. Although the rotary speed of handwheel 41 is low, being on the order of 10 r.p.m., and pump 37 must supply the high flow demand of brake cylinder 25 during the initial stage of a brake application, I have found that the total volumetric output of a low cost pump having relatively high internal leakage or slippage is adequtae if the pump is driven through a step-up gear train. Therefore, the FIG. 1 embodiment uses an inexpensive pump, and a gear train 42 which provides a speed increase on the order of 8.3 to 1. The ports 37a and 37b of pump 37 are connected with reservoir 36 through a pair of check valves 43 and 44 oriented to insure that the pump will receive fluid at its inlet port and develop pressure at its discharge port regardless of the direction of rotation. Reservoir 36 is located at a higher elevation than any other component of the brake circuit to insure a net positive suction head at the pump, and to encourage self-bleeding of air from the circuit.

It will be noted that pump 37 must supply the large flow demand of brake cylinder 25 as well as the demand of lock motor 32 during a brake application, but only the small demand of unlock motor 33 during a brake release. Because of the large difference between the flow requirements in the two modes of operation, lines 23 and 24 cannot be connected permanently in a closed circuit with pump 37, but must be switched back and forth between the pump and reservoir 36. This switching function is performed by shuttle valve 38. Valve 38 is actuated by a pair of opposed fluid pressure motors 45 and 46 which are connected with pump ports 37a and 37b, respectively, and thus the valve responds to the direction of operation of pump 37. When pump 37 is discharging to port 37b, shuttle valve 38 is shifted to the illustrated release position in which it connects lines 23 and 24 with reservoir 36 and port 37b, respectively, and when the pump discharges to port 37a, the shuttle valve is shifted to the application position in which line 23 is connected with port 37a and line 24 is vented to reservoir 36. It will be observed that, in each position, shuttle valve 38 also isolates the inlet port of pump 37 from the line 23 or 24 which is then vented to the reservoir. The isolation afforded in the application position is important because the crewman rotates handwheel 41 in steps and not continuously. But for the isolation feature, the pressure developed in cylinder 25 on each step could partially dissipate, as a result of backflow through the clearances of pump 37 to the unlock circuit, during the time needed for the crewman to reach back and "take another hitch" on wheel 41. As a result, it would be impossible to develop in the brake cylinder the high braking pressures which sometimes are needed.

While, in some cases, the condition of the hand brake can be easily determined merely by observing the positions of the brake shoes, it nevertheless is considered desirable to include in the preferred hand brake circuit a visual indicator which tells the crewmen whether the hand brake lock is applied or released. Unit 39 includes such an indicator in the form of a four-pointed star member 47 which is movable between the illustrated retracted position, in which it is covered by the housing of unit 39, and an extended position, in which it is outside the housng and can be observed. A spring biased ball detent 48 yieldingly holds indicator 47 in the retracted position against the gravitational and shock forces which are encountered in service. The indicator is automatically actuated as the brake is applied and released by a pair of opposed fluid pressure motors 49 and 51; the motor 49 being connected with line 23 and serving to extend the indicator, and the motor 51 being connected with line 24. Since indicator 47 is not physically connected with lock 27, it is desirable to include in its actuating circuit some means for guarding against a premature display of lock release. This means takes the form of a check valve 52 which prevents reverse flow from motor 49 to line 23, and a relief valve 53 through which this motor is connected with reservoir 36. Since relief valve 53 provides the only egress path from motor 49, it should be evident that motor 51 cannot retract indicator 47 until the pressure it receives from line 24 exceeds a predetermined value proportional to the cracking pressure of the relief valve. The components are so designed that the particular pressure at which retraction commences is slightly higher than the pressure which unlock motor 33 requires in order to overcome the maximum binding force developed between lock ring 28 and piston rod 25a. Since the magnitude of the binding force is proportional to the force with which brake cylinder 25 applies the brake, and the last mentioned force is limited directly by relief valve 53 during a brake application, it should be apparent that the illustrated scheme provides reasonably good assurance that lock 27 will actually be released when the indicator is retracted. Inasmuch as the pressure required to release lock 27 is lower than the maximum pressure which the circuit must be capable of developing in brake cylinder 25 (i.e., lower than the setting of relief valve 53), the desired correspondence between the conditions of lock 27 and indicator 47 can be achieved, while at the same time reducing operator effort, by giving motor 51 a larger effective area than motor 49.

Since the hand brake necessarily must be operated under conditions which preclude the crewman from seeing indicator 47, it is desirable that the circuit also furnish a nonvisual indication that the brake has been released. This function is performed by an unloading valve incorporated in unit 39 and including an exhaust port 54 connected with reservoir 36, and the piston 51a of motor 51. Port 54 is so positioned along the path of travel of piston 51a that it is uncovered, and thus opens a vent path for working space 51b and line 24, when indicator 47 is in its retracted position. Since opening of this path unloads pump 37, and thus reduces suddenly and materially the force which the crewman must exert to turn handwheel 41, the disclosed scheme provides an effective "feel" indication of brake release.

It is very desirable that all embodiments of the improved hand brake be operated in exactly the same way as the conventional, mechanical hand brakes now in use. Therefore, the circuit components in each version of the invention are so arranged that clockwise rotation of handwheel 41 applies the brakes, and counterclockwise rotation releases them.

When handwheel 41 is turned in the clockwise direction, pump 37 receives oil through check valve 44 and port 37b and discharges it under pressure through port 37a. The pressure differential created by the pump causes motors 45 and 46 to shift shuttle valve 38 to the application position in which line 23 is connected with port 37a, and line 24 is vented to reservoir 36. Oil delivered by pump 37 now flows to brake cylinder 25 and lock motor 32 and, through check valve 52, to indicator motor 49. During the initial stage of a brake application, the pressure in line 23 and the connected spaces is relatively low because cylinder 25 need overcome only the relatively small resisting forces associated with taking up slack and shoe clearance. Therefore, initially, Belleville spring 35 will hold lock ring 28 in its unlock position and prevent it from dragging on piston rod 25a, and detent 48 will maintain indicator 47 in its retracted position. After the brake shoes move into contact with the wheels, the resistance encountered by cylinder 25, and consequently the pressure in line 23, will rise. Now, lock motor 32 overpowers Belleville spring 35 and retracts member 34, so spring 31 tilts lock ring 28 to its locking position. At about the same time, motor 49 will overpower detent 48 and move indicator 47 to its extended position. Since line 24 is vented during a brake application, the oil displaced from unlock motor 33 and indicator motor 51 returns freely to reservoir 36. As the crewman continues to rotate handwheel 41, the pressure in line 23 will increase, and cylinder 25 will progressively increase the braking force exerted by the shoes. As in the case of the conventional mechanical hand brake, the crewman uses the resistance to movement of handwheel 41 as a measure of the actual braking force. The limiting value of the braking force is, of course, fixed by the setting of relief valve 53. It should be noted that, inasmuch as lock 28 is effective to prevent only retraction movement of rod 25a, movement of the lock to locking position prior to the end of the application cycle does not preclude cylinder 25 from fully applying the brakes.

Once the brakes have been set, lock ring 28 will keep them in that condition. Therefore, it is immaterial that the pressure in line 23 and brake cylinder 25 may, in time, be dissipated through leakage. Moreover, since lock ring 28 is held in the canted position by spring 31, the lock will not be released by the momentary relaxation in piston rod force which may result from the shocks accompanying impact of another car.

Release of the hand brake is effected exclusively by rotating handwheel 41 in the counterclockwise direction. This motion of the handwheel causes pump 37 to draw fluid from reservoir 36 through check valve 43 and port 37a, and to discharge it under pressure through port 37b. Under this condition, motors 45 and 46 shift shuttle valve 38 to the illustrated release position and thereby cause it to vent line 23 to reservoir 36 and to connect line 24 with pump port 37b. When the pressure in line 24 reaches the level required for unlock motor 33 to overcome the binding force existing between lock ring 28 and piston rod 25a, this motor overpowers Belleville spring 35 and causes member 34 to move ring 28 to the upright, unlocking position. As a result, the brakes immediately release. At a pressure slightly higher than that required to release the lock, motor 51, whose working space 51b is now isolated from unloading port 54, overcomes the opposing force of motor 49 and shifts indicator 47 to its retracted position. When the indicator reaches that position, and piston 51a uncovers port 54, the pressure in working space 51b, line 24, unlock motor 33 and pump port 37b suddenly decreases. This change in pressure is accompanied by a corresponding decrease in the resistance to movement of handwheel 41, thereby indicating to the operator the brakes are released. The brakes will remain released, and the circuit components will remain in their illustrated positions, until handwheel 41 is again turned in the clockwise direction.

Figure 2:
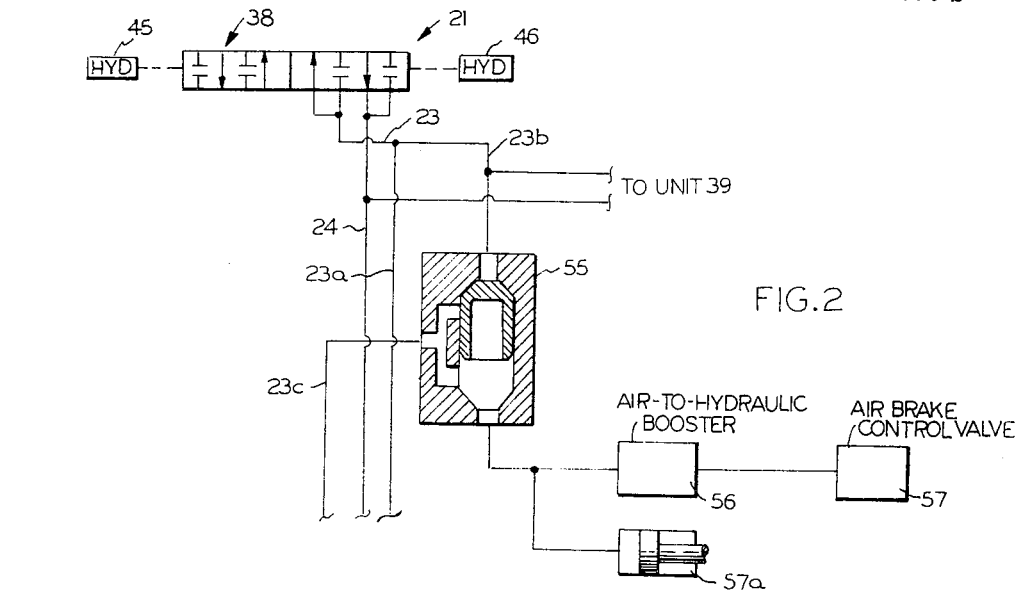
FIG. 2 is a schematic diagram showing the manner in which the hydraulic hand brake cylinder of FIG. 1 can be made to serve the service braking system.

(B) FIG. 2 embodiment

The circuit shown in FIG. 1 is exclusively a hand brake, but, with slight modification, its brake cylinder 25 can be made to serve also the car's service braking system in cases where the hand brake is not needed on all wheels. The necessary changes are shown in FIG. 2. In this alternative embodiment, the application line 23 is divided at control station 21 to provide one branch line 23a which leads directly to the lock motor, and a second branch line 23b which leads to brake cylinder 25 through a double check valve 55 and a third line 23c. The service braking system may be a conventional air brake system to which is added an air-to-hydraulic booster 56 which transduces the output of the standard air brake control valve 57 into a proportional, but higher, hydraulic pressure. The output side of booster 56 is connected directly with the brake cylinder or cylinders 57a for the wheels not equipped with hand brakes, and is connected with the hand brake cylinder or cylinders 25 indirectly through double check valve 55.

When a car using the FIG. 2 circuit is in service and the hand brake is released, line 23b will be vented. Therefore, if an air brake application is made, valve 55 will assume the illustrated position in which it isolates line 23c from line 23b and connects line 23c with booster 56. The remaining components of the hand brake circuit are isolated from the brake cylinder, so they have no effect on the operation of the air brake system. On the other hand, when the hand brake circuit is utilized to apply the brakes, oil under pressure is immediately delivered to lock motor 32 through branch line 23a and, when the hand brake pressure exceeds booster pressure, valve 55 will shift down to connect the brake cylinder with hand brake control station 21 and disconnect it from booster 56. Therefore, the brakes will be applied and locked in exactly the same way as in the FIG. 1 embodiment. Once the hand brake has been applied and lock 27 set in its locking position, the only way the brakes can be released is through the handwheel 41. Thus, if an air brake application and release is made while the hand brake is set, this will not cause release of the brakes even though brake cylinder pressure is completely dissipated.

Figure 3:
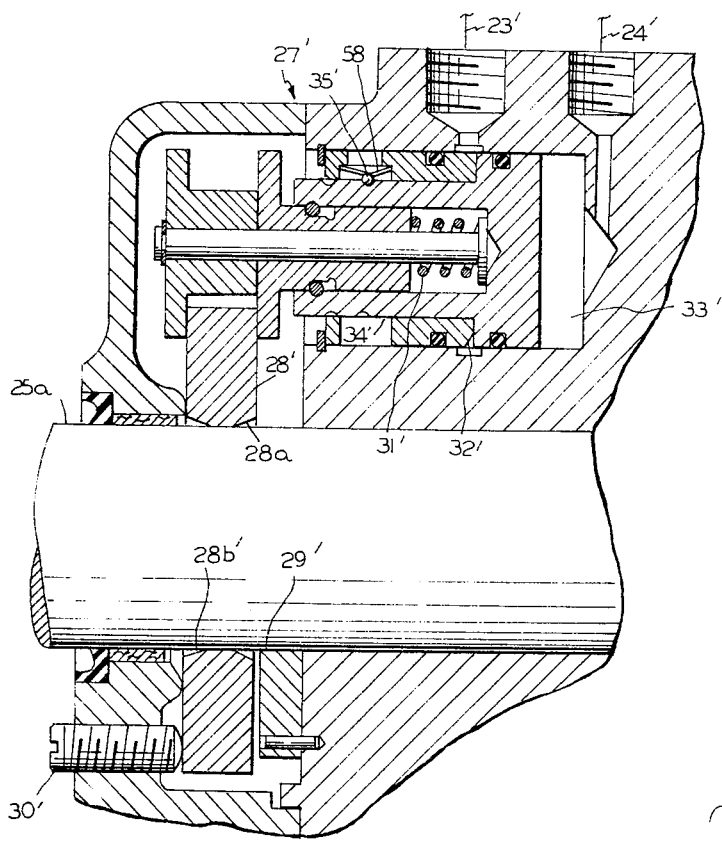
FIG. 3 is a sectional view of a brake cylinder showing an alternative form of the locking device.

(C) FIG. 3 embodiment

FIG. 3 shows an alternative lock mechanism 27' which may be used in any of the hand brake circuits described herein, and which is somewhat more compact than the lock 27 shown in FIG. 1. This version of the lock is considered particularly suitable for use in tread brake units because it minimizes length, which frequently is a critical dimension in this type of brake. It should be noted that the tread brake versions of the present invention do not need the force-multiplying linkages which characterize the prior air-operated counterparts because the pressure level is much higher. The significant parts of the alternative lock mechanism of FIG. 3 are identified by the same numerals as their FIG. 1 counterparts, with primes added to avoid confusion, and the construction of this embodiment should be evident from the drawing. However, it might be helpful to mention that the detent 35' in this embodiment comprises several circumferentially spaced balls which are arranged to be received in either one of a pair of peripheral grooves formed in member 34', and each of which is biased inward by one or more small Belleville springs 58. It also will be noted that the biasing spring 31' reacts between member 34' and lock ring 28' rather than between the lock ring and the casing which encloses the mechanism. Inasmuch as the FIG. 3 alternative operates in the same manner as the lock 27 in FIG. 1 and performs the same functions, further description of operation would be superfluous.

Figure 4:
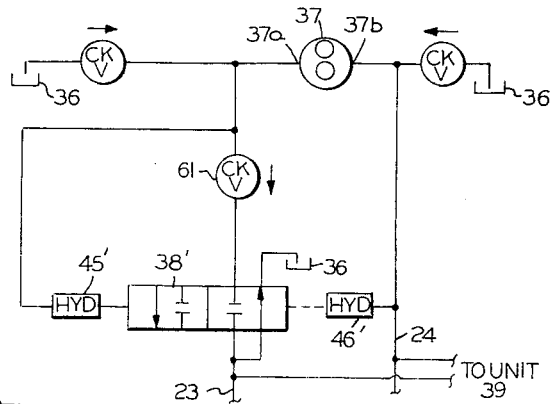
FIGS. 4 and 5 are schematic diagrams illustrating two alternative arrangements of the shuttle valve portion of the FIG. 1 circuit.
Figure 5:
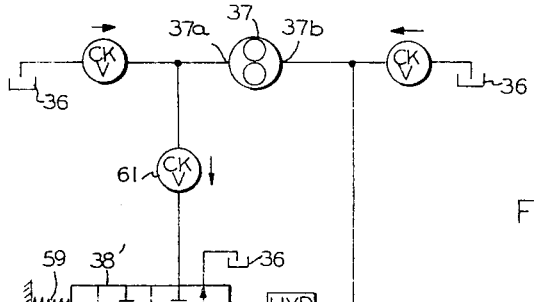

(D) Embodiments of FIGS. 4 and 5

As pointed out in connection with the FIG. 1 embodiment, control station 21 must include a shuttle valve because of the great difference between the flow requirements in the application and release cycles. Although the illustrated shuttle valve 38 controls the flows to and from both of the lines 23 and 24, actually it need control only the flow paths associated with line 23. This is so because brake cylinder 25 and lock motor 32 necessarily can absorb all of the oil displaced from unlock motor 33 during a brake application. In light of this, it is possible to use brake circuits in which unlock motor 33 communicates continuously with pump port 37b. Two such alternative arrangements are shown in FIGS. 4 and 5.

The embodiments of FIGS. 4 and 5 use a shuttle valve 38' which serves merely to connect line 23 with reservoir 36 or pump port 37a depending upon whether the brake is being released and pump 37 is discharging through port 37b, or the brake is being applied and pump 37 is discharging through port 37a. As in the case of its counterpart in FIG. 1, the shuttle valve 38' in FIG. 4 is actuated by a pair of motors 45 and 46 which respond to the pressures at the pump ports. However, in FIG. 5, the pressure motor 45 is replaced by a spring 59 which biases the shuttle valve 38' toward the application position. Since the unlock line 24 in these embodiments always communicates with pump port 37b, it is necessary to include in each circuit a check valve 61 which prevents reverse flow from line 23 to pump 37 when shuttle valve 38' is in the application position. The check valve prevents dissipation of the pressure in brake cylinder 25 during the intervals required for the crewman to "take another hitch" on the handwheel.

The embodiments of FIGS. 4 and 5 operate in essentially the same way as the FIG. 1 scheme. However, it should be noted that, since the shuttle valve 38' in FIG. 5 is biased toward the application position, it will move to that position when the unloading valve in unit 39 vents line 24 at the conclusion of a brake release cycle.

Figure 6:
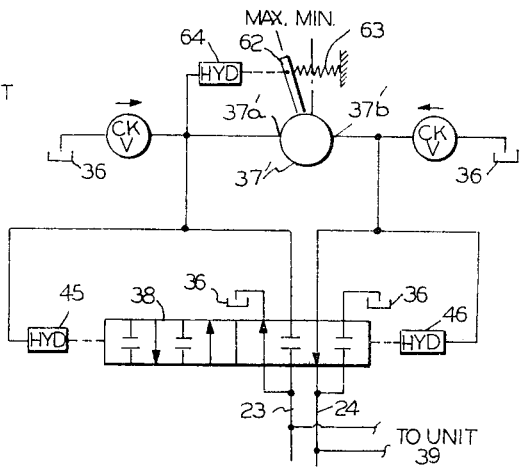
FIGS. 6 and 7 are schematic diagrams of circuits similar to the one shown in FIG. 1 but including variable displacement, pressure compensated pumps rather than a fixed displacement pump.
Figure 7:
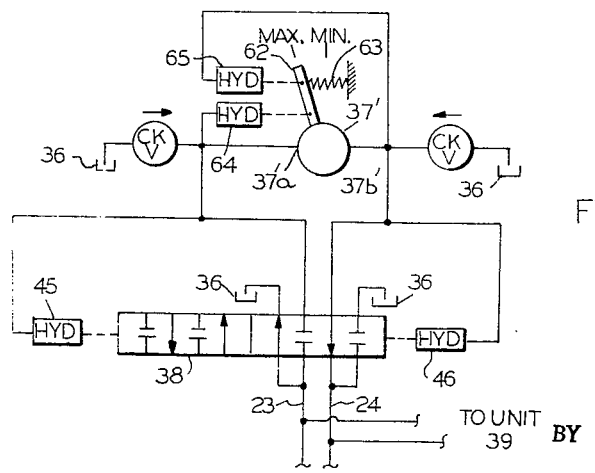

(E) Embodiments of FIGS. 6 and 7

All of the hand brake circuits described thus far utilize fixed displacement pumps. While this measure tends to minimize costs, it has the inherent drawback of requiring a relatively high number of turns of handwheel 41 in order to fully apply the brakes. In other words, from the standpoint of the number of revolutions of the handwheel, these schemes are no better than a conventional mechanical hand brake which affords the same degree of multiplication of human effort. This situation can be improved substantially, without reducing the maximum braking force or increasing the force which must be exerted at handwheel 41, by employing a variable displacement, pressure compensated pump. FIGS. 6 and 7 show two ways this type of pump can be incorporated in the FIG. 1 circuit.

In FIG. 6, the variable displacement pump 37' includes a displacement control element 62 which is movable between minimum and maximum displacement positions, and a discharge pressure compensator which comprises a compensation spring 63 and a motor 64 which responds to the pressure at pump port 37a'. The spring 63 biases element 62 toward the maximum displacement position; therefore, during the initial stage of a brake application when system pressure is low, element 62 assumes this position and causes the pump to discharge fluid at the maximum rate per revolution. This permits rapid take-up of slack and shoe clearance. As soon as the shoes contact the wheels and system pressure rises, motor 64 will move element 62 in the displacement-reducing direction. During the last stage of an application, element 62 will be positioned in the minimum displacement position. The reduction in pump displacement at the end of the brake application keeps the torque which the operator must exert on the handwheel within the limit established by the AAR, but does not adversely affect the operation of the circuit because, once slack and clearance have been eliminated, the brake cylinder requires very little additional oil in order to fully apply the brakes.

The pump compensator in FIG. 6 responds only to the pressure at port 37a' and, therefore, during the brake release cycle, displacement control element 62 stays in the maximum displacement position. In cases where discharge pressure compensation is required in both directions of operation, the compensator includes a second motor 65 (see FIG. 7) which responds to the pressure at pump port 37b'.

Figure 8:
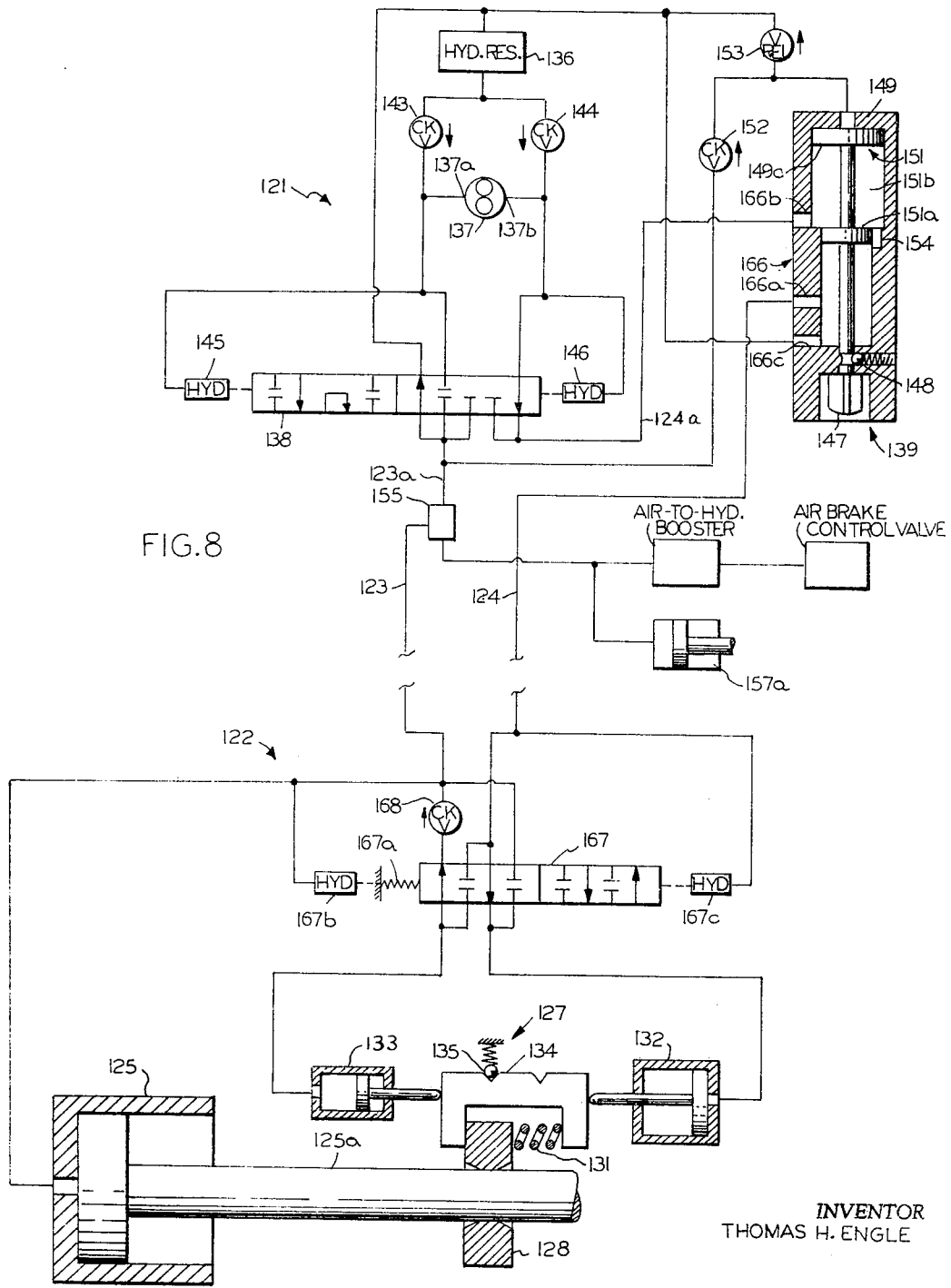
FIGS. 8 and 9 are schematic diagrams of alternative hand brake-service brake circuits which employ two control lines for each braking station.

(F) FIG. 8 embodiment

Although the combined hand brake-air brake circuit shown in FIG. 2 has the advantage of being relatively simple, it requires three lines 23a, 23c and 24 extending between the control and braking stations. In cases where a desire or requirement for fewer lines offsets an increase in circuit complexity, the alternative schemes of FIGS. 8–10 may be employed.

In FIG. 8, the stations 121 and 122 are interconnected by a pair of control lines 123 and 124, and the circuit is designed to operate in accordance with the following schedule of relative pressures:

(a) Line 123 pressurized and line 124 vented—cylinder 125 applies the brakes, but motors 132 and 133 do not change the condition of lock ring 128.

(b) Both lines pressurized—cylinder 125 applies the brake and lock motor 132 shifts lock ring 128 to locking position.

(c) Line 124 pressurized and line 123 vented—unlock motor 133 releases lock 128 and cylinder 125 releases the brakes.

(d) Both lines vented—brake cylinder 125 is vented or de-energized and lock ring 128 remains in its last position.

Although control station 121 in the two-line embodiment includes counterparts of the shuttle valve 38 and combined valving and indicating unit 39 of FIGS. 1 and 2, the connections to and design of the new components 138 and 139 are quite different. As shown in FIG. 8, line 123 is connected with shuttle valve 138 through the double check valve 155 and passages 123a, but line 124 is selectively connected with the shuttle valve, through passage 124a, or with reservoir 136 by a switching valve 166 incorporated in unit 139 and including the piston 151a and three ports 166a, 166b and 166c. When shuttle valve 138 is in the illustrated release position, it connects passages 123a and 124a with reservoir 136 and pump port 137b, respectively. On the other hand, when valve 138 shifts to the application position, it interconnects the two passages 123a and 124a and the pump port 137a. Thus, except for the overriding effect of the unloading valve in unit 139, shuttle valve 138 serves either to pressurize passage 124a and vent passage 123a, or to pressurize both passages.

The valving and indicating unit 139 includes the switching valve 166, mentioned above, as well as an indicator 147, and an unloading valve consisting of piston 151a and port 154. While this device is actuated by a pair of motors 149 and 151 corresponding to the motors 49 and 51, respectively, in FIG. 1, it should be noted that here the motors utilize a common piston 149a, and that the working space 151b of motor 151 is bounded by the pistons 149a and 151a.

Since the relative pressures in lines 123 and 124 of FIG. 8 govern the operation of braking station 122, this station must include a pressure responsive logic device in order to perform its intended functions. This device takes the form of a shuttle valve 167 and a check valve 168 which control connections between the lock and unlock motors 132 and 133 and the two lines 123 and 124. Valve 167 is biased by spring 167a to the illustrated position, in which it connects lock motor 132 directly with line 124 and connects unlock motor 133 with line 123 through check valve 168, and is shifted to its second position by a pair of opposed, equal area motors 167b and 167c which respond to the pressures in lines 123 and 124, respectively. In this second position, shuttle valve 167 reverses the connections between the motors 132 and 133 and the lines 123 and 124, and, in effect, removes check valve 168 from the circuit.

During a pneumatic brake application, double check valve 155 isolates line 123 from passage 123a and connects the line with booster 156. Therefore, the oil delivered by the booster flows through line 123 to cylinder 125 and is effective to apply the brakes. Since the pressure in line 123 either equals or exceeds the pressure in line 124, shuttle valve 167 assumes the illustrated position wherein it cooperates with check valve 168 to block flow from line 123 to either lock motor 132 or unlock motor 133. Thus, it will be apparent that a pneumatic application or release will affect only the pressure in cylinder 125 and will not change the condition of lock ring 128.

When the crewman rotates the handwheel in the clockwise direction to apply the hand brake, pump 137 discharges oil under pressure through port 137a, and thereby causes motors 145 and 146 to shift shuttle valve 138 to application position. This opens a flow path from port 137a to passages 123a and 124a, so oil delivered by pump 137 now flows to brake cylinder 125 through double check valve 155 and line 123, and, through check valve 152, to indicator motor 149. Simultaneously, oil also flows through passage 124a and port 166b to the working space 151b of indicator motor 151. Since motor 151 has a smaller effective area than motor 149, the last mentioned motor will be effective to move indicator 147 to its extended position as soon as system pressure rises to the level required for the motor to overpower detent 148. As the indicator moves downward, piston 151a overtravels port 166a, thereby disconnecting it from exhaust port 166c and connecting it with working space 151b. This permits oil under pressure to flow through line 124 to shuttle valve 167. Motor 167c now balances the opposing force of motor 167b, but does not shift valve 167 from the illustrated position. Therefore, lock motor 132 becomes pressurized and is effective to overpower detent 135 and permit spring 131 to tilt lock 128 to its locking position. Although movement of member 134 is opposed by unlock motor 133, which is subjected to the same pressure as lock motor 132, the differential between the areas of these motors insures that member 134 will shift. In lieu of using differential areas, motor 133 could be equipped with a return spring that retracts it at the end of each brake release cycle.

As in the preceding embodiments, the hand brake is released by turning the handwheel in the counterclockwise direction. Now, motors 145 and 146 shift shuttle valve 138 back to the illustrated release position in which it interrupts the connection between passages 123a and 124a, connects passage 123a with reservoir 136, and connects passage 124a with pump port 137b. The oil delivered to passage 124a by pump 137 passes through switching valve 166 (ports 166b and 166a being interconnected at the commencement of the release cycle) to line 124, and then to shuttle valve 167. Since line 123 is now vented, motor 167c shifts valve 167 to its second position to open one flow path from line 124 to unlock motor 133 and a second such path from lock motor 132 to line 123. When system pressure in line 124 rises to the required level, unlock motor 133 will overpower detent 135 and shift lock ring 128 to the illustrated unlocking position. At this time, indicator motor 151 will overcome the opposing force developed by motor 149 and commence to retract indicator 147. Since, in this embodiment, the effective area of motor 151 is, and must be, less than the effective area of motor 149, retraction of the indicator requires a pressure in line 124 higher than the setting of relief valve 153. When indicator 147 has moved part way to the retracted position, switching valve 166 will disconnect port 166b from port 166a and connect the latter port with reservoir 136 through port 166c. This action vents line 124 and unlock motor 133 and permits spring 167a to return shuttle valve 167 to the illustrated position. When indicator 147 reaches its fully retracted position, piston 151a uncovers port 154, thereby opening a vent path from working space 151b to reservoir 136 and unloading pump 137. As mentioned earlier, the resulting decrease in the torque required to turn the handwheel indicates to the crewman that the hand brake is released.

Figure 9:
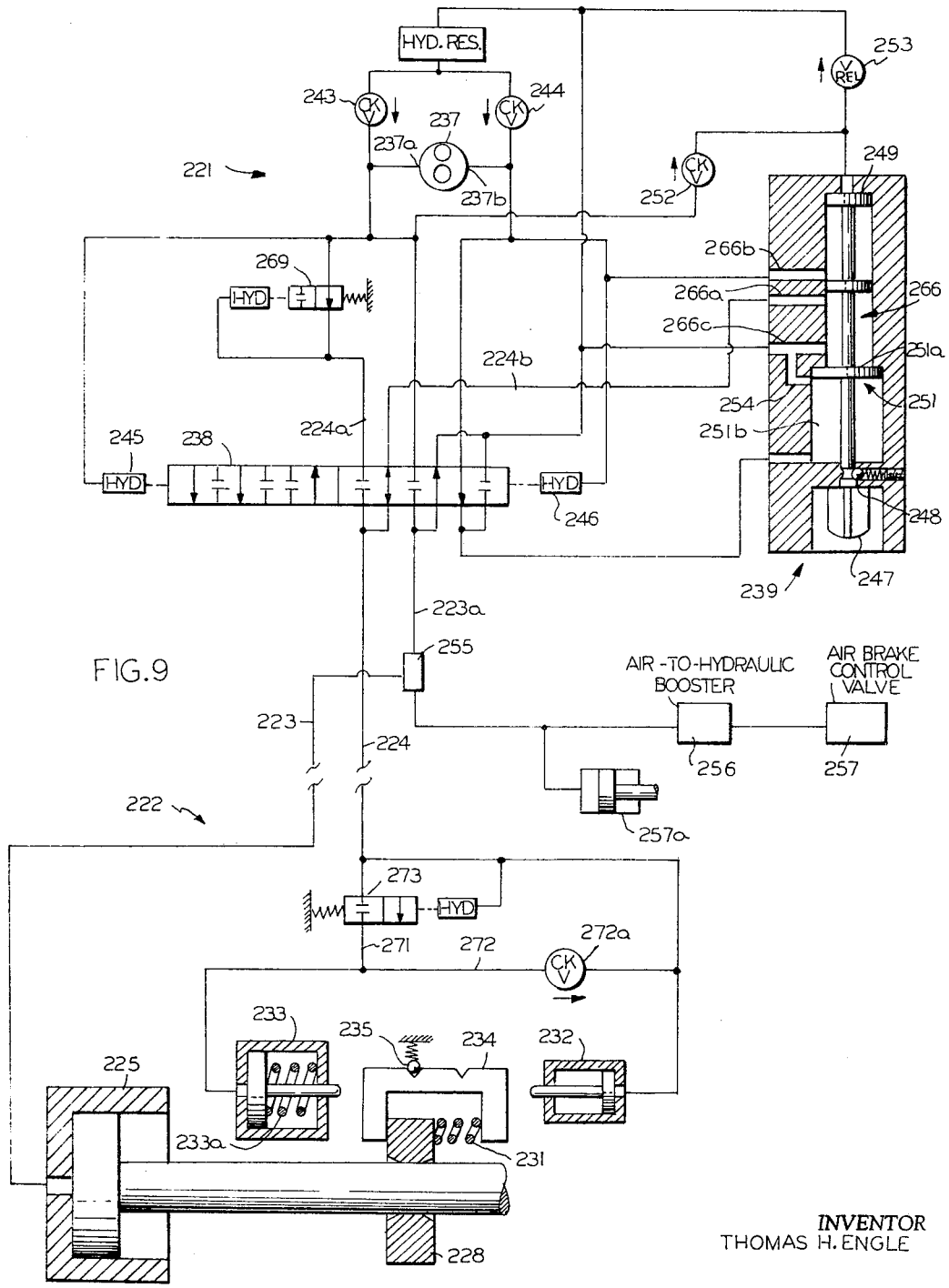

(G) FIG. 9 embodiment

FIGURE 9 depicts an alternative two-line circuit in which line 223 controls only the actual braking effort of cylinder 225, and line 224 controls the lock ring 228. The circuit is designed to operate in accordance with the following schedule of pressures:

(a) Line 223 pressurized or vented and line 224 vented—cylinder 225 applies or releases the brakes but motors 232 and 233 do not change the condition of lock ring 228.

(b) Line 223 pressurized to any degree and line 224 pressurized to a predetermined, relatively low value—cylinder 225 applies the brakes and motor 232 shifts lock ring 228 to locking position.

(c) Line 224 pressurized to a level above said predetermined value and line 223 vented—brake cylinder 225 is vented and unlock motor 233 releases lock ring 228.

From this schedule it will be seen that control station 221 must establish in line 224 two different pressures depending upon the direction of operation of pump 237, and that braking station 222 must include a logic device for operating the lock and unlock motors 232 and 233 in accordance with the pressure received through line 224. As shown in FIG. 9, line 224 is selectively connected with a passage 224a or a passage 224b by shuttle valve 238. The passage 224a leads to pump port 237a through a pressure responsive valve 269 which is designed to close this connection when the pressure in the passage exceeds the limited value mentioned above. Passage 224b, on the other hand, leads to a switching valve 266 incorporated in unit 239 and thus is connected with reservoir 236 or pump port 237b depending upon whether the lock ring 228 is released or applied. In addition to the function just mentioned, shuttle valve 238 also serves to connect passage 223a with either reservoir 236 or pump port 237a, and to connect the working space 251b of indicator motor 251 with either reservoir 236 or pump port 237b.

At braking station 222, line 224 is in continuous communication with lock motor 232 and is connected with unlock motor 233 through two paths 271 and 272; the path 271 normally being closed by a relief valve 273 which opens only when the pressure in line 224 exceeds the setting of valve 269 in control station 221, and the path 272 containing a check valve 272a which permits flow from, but not toward, the unlock motor. Unlock motor 233 has a larger effective area than lock motor 232 so that it will be effective to shift lock ring 228 to its unlock position when valve 273 is open and both motors are pressurized.

During a pneumatic brake application, double check valve 55 isolates line 223 from passage 223a, so the pressure in brake cylinder 225 follows the output pressure of booster 256. Line 224 is isolated from the booster circuit, and therefore neither a pneumatic application nor a subsequent release will change the condition of lock ring 228.

When the hand brake is applied, pump 237 discharges through port 237a, and motors 245 and 246 shift shuttle valve 238 to application position. Thus, oil delivered by the pump flows to brake cylinder 225 through passage 223a, double check valve 255 and line 223, and also flows to indicator motor 249 through check valve 252. In addition, a portion of the pump output passes into line 224 through limiting valve 269 and passage 224a. As soon as the pressure in passage 224a rises to the setting of valve 269, the valve will close and prevent further increases in the pressure. The limited pressure transmitted to the lock motor 232 through line 224 causes the motor to overpower detent 235 and permit spring 231 to tilt lock ring 228 to its locking position. Since, as pointed out below, unlock motor 233 is vented and retracted by its return spring 233a at the end of the immediately preceding release cycle, this motor does not preclude shifting of member 234 and tilting of ring 228.

Movement of shuttle valve 238 to application position open a vent path from the working space 251b of motor 251 to reservoir 236; therefore, the oil delivered to motor 249 enabes it to overpower detent 248 and extend indicator 247. As the indicator moves downward, switching valve 266 disconnects port 266a from exhaust port 266c and connects it with port 266b. However, since passage 224b is now blocked at shuttle valve 238, this valving action has no immediate effect.

As in other embodiments of the invention, the brakes remain applied and locked until the crewman rotates the handwheel in the counterclockwise direction. At that time, pump 237 will commence to discharge through port 237b, and shuttle valve 238 will immediately shift back to the illustrated release position to thereby vent passage 223a to reservoir 236, to interconnect passage 224b and line 224, and to interconnect working space 251b and pump port 237b. Since the ports 266a and 266b of switching valve 266 are interconnected when indicator 247 is extended, a portion of the pump output is now free to flow to braking station 222 through line 224. During this mode of operation the output pressure of pump 237 is not limited; therefore, valve 273 opens to transmit oil under pressure to unlock motor 233. As a result, this motor overpowers detent 235 and forces lock ring 228 to the unlocking position against the opposing, but smaller, force developed by lock motor 232. Once the lock is released, cylinder 225 retracts and the oil expelled from it returns to reservoir 236 through line 223, double check valve 255, passage 223a and shuttle valve 238.

Concurrently with release of lock 228, motor 251 becomes effective to retract indicator 247 against the opposition of motor 249. As the indicator approaches its retracted position, switching valve 266 interconnects ports 266a and 266c and thereby vents line 224 to reservoir 236. This dissipates the pressure in lock motor 232 and allows valve 273 to close. The oil in unlock motor 233 now escapes to line 224 through check valve 272a, so return spring 233a is able to retract this motor. When indicator 247 finally reaches the retracted position, piston 251a overtravels unloading port 254 and vents working space 251b to reservoir 236. This action unloads the pump and thereby enables the operator to "feel" that the brakes are released.

Figure 10:
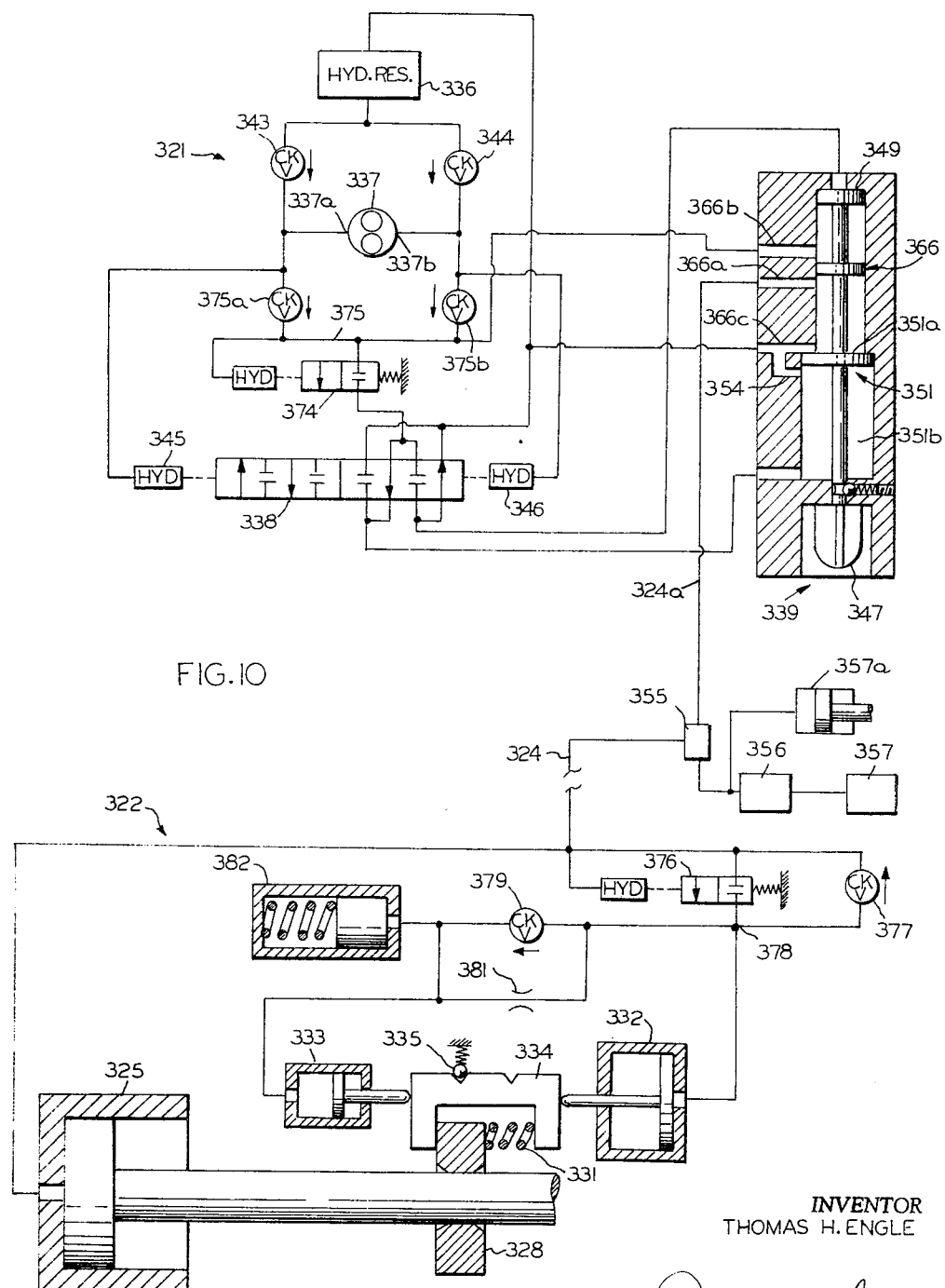
FIG. 10 is a schematic diagram of an alternative hand brake-service brake circuit which employs only a single control line for each braking station.

(H) FIG. 10 embodiment

FIGURE 10 illustrates a way in which the required hand brake and air brake functions can be carried out using only a single connecting line 324 between the control and braking station 321 and 322. The operating schedule for this embodiment is:

(a) Line 324 pressurized up to a predetermined maximum value—brake cylinder 325 applies the brakes but motors 332 and 333 do not change the condition of lock 328.

(b) Line 324 pressurized to a value above said predetermined maximum—cylinder 325 applies the brakes, and motor 332 causes lock 328 to assume the locking position.

(c) Line 324 pressurized to a value above said predetermined maximum and then rapidly vented—cylinder 325 is vented and motor 333 is caused to shift lock 328 to the unlocking position.

The unique pressurizing and venting actions required of control station 321 are performed by mechanism including a relief valve 374 and a switching valve 366. The relief valve is set to open at a pressure higher than the maximum output pressure of booster 356, and its inlet is connected with the pump ports 337a and 337b through common passage 375 and a pair of check valves 375a and 375b. The outlet of relief valve 374 leads to shuttle valve 338 which serves to connect it with indicator motor 349 or indicator motor 351 depending upon whether the hand brake is being applied or released. Inclusion of relief valve 374 insures that indicator 347 cannot leave either of its extreme positions until system pressure rises above the maximum output pressure of the air brake system. Switching valve 366 is operated by motors 349 and 351 and is connected with line 324 through passage 324a and double check valve 355. This valve 366 serves to connect passage 324a with reservoir 336 when indicator 347 is between the retracted position and an intermediate position, and to connect the passage with common passage 375 in all other positions of the indicator.

At the braking station 322, line 324 is in continuous communication with brake cylinder 325, but is connected with the lock and unlock motors 332 and 333 through parallel paths controlled by relief valve 376 and check valve 377, respectively. Relief valve 376 is set to open at the same pressure as relief valve 374; therefore, motors 332 and 333 cannot be pressurized by the air brake system. Motor 332 communicates directly with the junction 378 of the parallel paths leading through valves 376 and 377, but motor 333 communicates with the junction through a oneway flow restrictor comprising a parallel connected check valve 379 and flow restriction 381. Unlock motor 333 also is connected directly with a pressure accumulator 382 which, in combination with the one-way flow restrictor, creates a pressure differential sufficient to cause unlock motor 333 to be effective to release lock 328 at the appropriate time. As will be evident from the following description of operation, lock motor 332 must have a larger effective area than unlock motor 333.

When the air brake system is being operated, double check valve 355 isolates line 324 from passage 324a, so the pressure in brake cylinder 325 depends solely upon the output of booster 356. Flow from line 324 to the lock and unlock motors 332 and 333 can take place only through relief valve 376; therefore, since the cracking pressure of this valve is higher than the maximum output of the booster, operation of the air brake system does not cause motors 332 and 333 to change the condition of lock 328.

When the handwheel is turned in a direction to apply the hand brake, pump 337 discharges through port 337a, and motors 345 and 346 immediately shift shuttle valve 338 to the application position in which it vents indicator motor 351 to reservoir 336, and connects indicator motor 349 with the downstream side of relief valve 374. The oil delivered by pump 337 passes into common passage 375 through check valve 375a, and from there it flows to the port 366b of switching valve 366. Since indicator 347 is in the retracted position at the commencement of an application, and port 366b is isolated from port 366a, initial operation of the handwheel is ineffective to change the pressure in line 324. However, as the pressure in common passage 375 rises above the setting of relief valve 374, this valve opens and transmits oil to indicator motor 349. At this point, indicator 347 commences to move downward. When it reaches a predetermined intermediate position, switching valve 366 disconnects port 366a from exhaust port 366c and connects it with port 366b. Now, oil delivered by pump 337 is free to flow into passage 324a and, through double check valve 355 and line 324, to the braking station 322. This oil passes directly into the cylinder 325, so the cylinder immediately commences to apply the brakes. Since the pressure required during the initial stage of an application is relatively low, relief valve 374 will close as soon as switching valve 366 interconnects ports 366a and 366b, and there will be a sudden decrease in the pressure at pump port 337b. As a result, indicator 347 will cease to move, and the operator will feel a reduction in the resistance to movement of the handwheel. These two indications should alert him to the fact that lock 328 is not applied and that he must continue to rotate the handwheel until maximum resistance is again encountered.

Once slack and shoe clearance have been taken up, continued rotation of the handwheel will cause the discharge pressure of pump 337 to rise to the setting of relief valve 374. At that point, relief valve 374 will open, and indicator 347 will recommence movement to the extended position. Simultaneously, relief valve 376 will open and direct oil under pressure into lock and unlock motors 332 and 333, and accumulator 382. Inasmuch as motor 332 has a larger effective area than motor 333, it is effective to overpower detent 335 and permit spring 331 to tilt lock ring 328 to the locking position even though motor 333 is subjected to an equal pressure.

During a hand brake application, the accumulator 382 is charged with oil under a pressure determined by the setting of relief valve 376; therefore, when the operator releases the handwheel, the accumulator will maintain the unvented portion of the brake circuit under pressure. If, as a result of leakage, the pressure in this portion should decrease, the accumulator will discharge oil through flow restriction 381 ad keep the circuit liquid-filled. Although flow through restriction 381 can create a differential between the pressure in motors 333 and 332 sufficient to enable motor 333 to release lock 328, this does not occur under normal circumstances because the rate of leakage, and consequently the flow rate through the restriction, is very small.

When the operator wishes to release the hand brake, he turns the handwheel in the counterclockwise direction and causes pump 337 to discharge oil through port 337b. Shuttle valve 338 now shifts to the illustrated release position, thereby connecting indicator motor 351 with the outlet of relief valve 374, and connecting motor 349 with reservoir 336. Since indicator 347 is in the extended position, oil delivered by pump 337 can flow immediately to braking station 322 through check valve 375b, common passage 375, switching valve 366, passage 324a, double check valve 355 and line 324. When the pressure in line 324 rises to the setting of relief valve 376, this valve will open and permit recharging of accumulator 382 (assuming that the accumulator was depleted of oil during the immediately preceding period during which the hand brake was applied). At the same time, relief valve 374 will open and deliver oil under pump discharge pressure to indicator motor 351. As a result, motor 351 commences to retract indicator 347. When the indicator reaches the intermediate position mentioned earlier, switching valve 366 disconnects passage 324a from common passage 375 and connects it with reservoir 336 through port 366c. The pressure in line 324 now quickly dissipates, so oil escapes from brake cylinder 325, relief valve 376 closes, and accumulator 382 commences to expel oil into line 324 via restriction 381 and check valve 377. Under these conditions, the flow velocity through, and the pressure drop across, restriction 381 is high; therefore, unlock motor 333 is subjected to a much higher pressure than motor 332. As a result, the unlock motor 333 becomes effective to release lock 328 against the opposing force of lock motor 332. Although the valving action of switching valve 366 vents line 324, it does not dissipate the pressure in common passage 375. Therefore, motor 351 is still effective to move indicator 347 to its fully retracted position. When it reaches that position, piston 351a uncovers port 354 and thereby vents working space 351b. This venting action does not unload pump 337, as in the previous embodiments, because of the presence of relief valve 374, but it does have the effect of precluding build-up of excessive pressure in the system after the indicator reaches the limit of its upward travel.

(I) Embodiments of FIGS. 11–14

It will be recalled that, in the combined air brake-hand brake embodiments of FIGS. 2, 8 and 9, the passages 23b, 123a and 223a are vented to the reservoir during a release of the hand brake in order to provide a flow path for the oil which must be expelled from the braking station to effect the release. However, if the air brake is cycled while the hand brake is applied, the double check valve 55, 155 or 255 will automatically shift to a position in which it isolates the passage 23b, 123a or 233a from the connected control line 23c, 123 or 223. Since, during a subsequent release of the hand brake, venting of passage 23b, 123a or 223a will not cause the double check valve to shift, it is evident that oil cannot escape from the braking station through the hand brake control mechanism. Since an escape path for the braking station must be provided in order to release the hand brake, the embodiments of FIGS. 2, 8 and 9 contemplate allowing the expelled oil to flow through the double check valve to the brake cylinder or cylinders 57a, 157a or 257a associated with wheels which are not equipped with hand brakes. This, of course, means that these circuits cannot be applied to all of the car's wheels. This drawback presents no problem in most cases, because usually the hand brake is required only on one-half of the car's wheels, but it may limit the usefulness of these circuits on the larger, heavier cars which are being proposed for the future.

The embodiment of FIG. 10 is not characterized by the drawback just mentioned because, at the beginning of a hand brake release, its control station 321 develops a pressure in passage 324a which is higher than the maximum output of booster 356 and which shifts double check valve 355 to the position in which it interconnects passage 324a and line 324. Thus, cycling of the air brake system while the hand brake is applied, will not preclude subsequent venting of cylinder 325 and motors 332 and 333 through the control station 321.

Another drawback of the embodiments of FIGS. 2, 8 and 9, as well as the embodiment of FIG. 10, is that, during a normal hand brake release, i.e., a release in which the oil expelled from the braking station is transmitted to the reservoir through the control station, all of the oil in the brake cylinder or cylinders is bled off. Thus, if the booster used in the air brake system is of the slack-adjusting type, such as the one described in my co-pending application Ser. No. 812,551 filed Mar. 17, 1969, the volumetric displacement of the booster per stroke must be sufficient to accommodate the maximum volume of oil which can be required by the hand brake cylinders. In other words, since the release action of the hand brake control destroys the slack-compensating effect of the booster on the hand brake cylinders, booster capacity must be selected as though that slack-compensation were not provided. The resulting increase in the size of the booster could be intolerable in cases where the hand brake uses a plurality of brake cylinders. One way to reduce this effect is to incorporate in double check valve 55, 155, 255 or 355 a biasing spring which urges the valve to the position in which it isolates the braking station from the hand brake control station. The spring would be designed to hold the valve in that position against a relatively low pressure differential, for example, 5 p.s.i. Since the modified double check valve precludes the hand brake control station from decreasing brake cylinder pressure below 5 p.s.i. (assuming that booster output pressure is zero), it insures that some oil will be trapped in the cylinders. In effect, the spring biased double check valve constitutes a partial slack adjuster for the hand brake. However, the slack-adjusting action is impositive, and this scheme entails the possible disadvantage of precluding full release of brake cylinder pressure.

Figure 11:
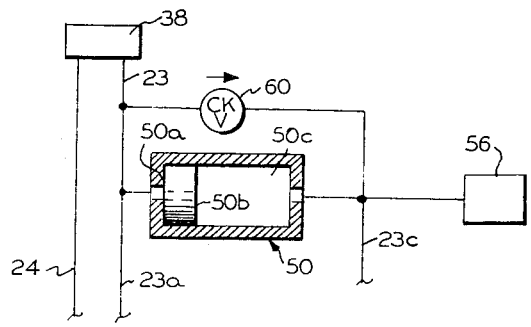
FIGS. 11–14 are schematic diagrams illustrating a modification of the embodiments of FIGS. 2, 8, 9 and 10, respectively, which affords positive slack compensation and permits use of the hand brake on all wheels.

A better approach to the slack-compensating problem, and one which also enables the circuits of FIGS. 2, 8 and 9 to be applied to all of the car's wheels, is depicted in FIGS. 11–14. In these alternatives, the double check valve is replaced by a dummy cylinder or pressure translator and a by-pass check valve. In FIG. 11, which shows the alternative in the environment of the FIG. 2 circuit, the dummy cylinder 50 and by-pass check valve 60 are connected between lines 23a and 23c, and the booster 56 is connected directly to line 23c. Check valve 60 is biased closed so that the differential between the pressures in lines 23a and 23c encountered during a normal hand brake application is not high enough to open it. Therefore, in this case, oil delivered to the space 50a at the left end of cylinder 50 through line 23 merely shifts piston 50b to the right and displaces an equal volume of oil from space 50c into line 23c and the connected brake cylinders. However, if, as a result of shoe wear, piston 50b reaches the limit of its travel before the brakes are fully applied, check valve 60 will open and allow oil to flow from passage 23 into line 23c. The volume of fluid thus admitted into the brake cylinder circuit exactly compensates for shoe wear. During a release of the hand brake, line 23a is vented. Therefore, the oil under pressure in the brake cylinder circuit flows into the space 50c at the right end of cylinder 50 and causes piston 50b to move to the left and displace an equal quantity of oil from space 50a into line 23a. The amount of oil which can escape from the brake cylinders, and consequently the shoe clearance which is established, depends upon the stroke of piston 50b since, once the piston reaches the limit of its leftward movement, flow into space 50c ceases. In view of this, it should be evident that the FIG. 11 scheme inherently compensates for shoe wear.

If an air brake application occurs while the hand brake of FIG. 11 is released, booster 56 will discharge oil into line 23c to thereby energize the brake cylinders. Since, under this condition, piston 50a is fully retracted in cylinder 50, and line 23a is vented, pressurization of the brake cylinder circuit by booster 56 will not apply the hand brake lock. When the air brake is released, the oil in the brake cylinders will return to booster 56 through line 23c and the shoes will retract to reestablish the desired clearance. Piston 50b, of course, will remain in the retracted position. If the air brake is applied while the hand brake is set, booster 56 will discharge little if any oil into line 23c because the brake cylinder circuit is already liquid-filled and is under pressure. Moreover, since line 23a also is under pressure at this time, and line 24 is vented through shuttle valve 38, piston 50b will not move, and the hand brake lock will remain set. When the air brake is subsequently released, booster 56 will withdraw little if any oil from line 23c, but, in any event, the hand brake lock will not be released because only pressurization of line 24 can produce that result.

It should be noted that if a hand brake release is effected while the air brake is applied, piston 50b will move to the left and, in effect, impose a flow demand on booster 56. It is essential that the booster satisfy completely this demand, for otherwise braking pressure would decrease, and the air brake would be rendered ineffective. This, of course, means that the volume swept by piston 50b as it moves between its limiting positions must be smaller than the discharge capacity of booster 56. In other words, the capacities of the two components must be so correlated that piston 50b always reaches the end of its retraction stroke before the booster completes its discharge stroke. This same requirement is applicable to the embodiments of FIGS. 12–14 as well as the embodiments of FIGS. 15 and 16.

Figure 12:
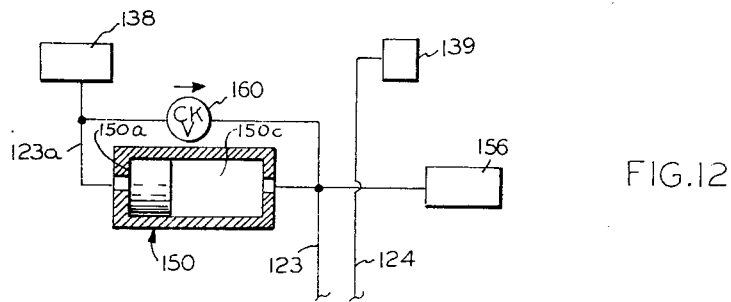
Figure 13:
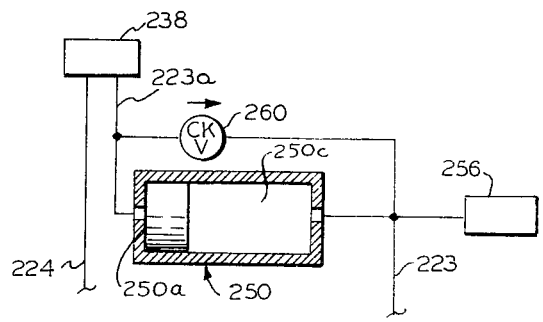

FIGURES 12 and 13 show how dummy cylinders 150 and 250 and by-pass check valves 160 and 260 may be incorporated in the circuits of FIGS. 8 and 9. These embodiments operate in the same ways as their counterparts employing double check valves except that, as in the case of FIG. 11, they afford more positive control over shoe clearance and do not require the prseence of non-hand brake cylinders in order to effect hand brake release after an air brake application. Thus, the braking stations for all wheels may be designed as shown in either FIG. 8 or 9 and connected with a common pair of control lines 123 and 124 or 223 and 224.

Figure 14:
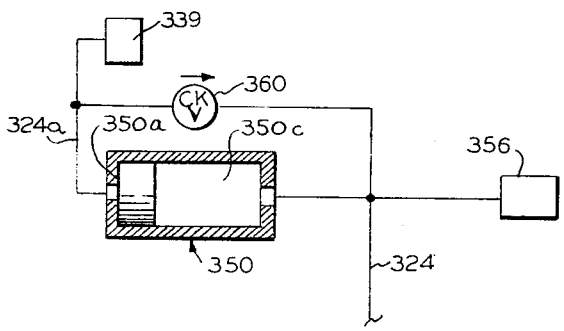

FIGURE 14 illustrates the corresponding alternative to the FIG. 10 circuit. The operation of this scheme will be evident from what has already been said when it is remembered that changes in the condition of the hand brake lock of this circuit require the production in line 324 of a pressure higher than the maximum output pressure of booster 356.

(J) Embodiment of FIGS. 15 and 16

Although the combined air brake-hand brake circuits of FIGS. 11–14 eliminate the disadvantages of the schemes employing double check valves, this is accomplished at the expense of sacrificing a desirable feature, namely the inherent ability to isolate the air brake booster from the brake cylinders while the hand brake is being applied. In each of the circuits shown in FIGS. 11–14, the air-to-hydraulic booster is in continuous communication with the hand brake cylinders, and therefore leakage at the booster could prevent the hand brake circuit from developing the required braking pressure. Moreover, in systems using the booster of application Ser No. 812,551 or a similar device which includes a relief valve, it is possible, under certain circumstances, that this valve will open when the hand brake is applied and limit brake cylinder pressure to a value far below that required for proper braking. This disadvantages is eliminated by the hand brake-air brake circuit shown in FIG. 15.

The preferred circuit of FIG. 15 includes a dummy cylinder 70 and a by-pass check valve 80 corresponding to the components 50 and 60, respectively, in FIGS. 11–14, but here the booster communicates directly with cylinder space 70c and is selectively connected with and disconnected from brake line 23c, 123, 223 or 324 by a shut-off valve 83. The valve 83 is biased open by a spring 84 and a pressure motor 85 which responds to the pressure in the brake line, and is shifted closed by the piston 70b of dummy cylinder 70. The connection between valve 83 and piston 70b is such that the valve is closed only when the piston approaches the limit of its travel to the right. In the schematic, this arrangement is represented by the lost motion connection 86.

When the FIG. 15 circuit is in service and the air brake is released, a hand brake application will cause oil to flow into cylinder space 70a and move piston 70b to the right. During the initial stage of an application, shut-off valve 83 will be open; therefore, the oil displaced from space 70c will pass through the valve to line 23c, 123, 223 or 324 and thence to the braking stations. If no substantial amount of oil can escape from space 70c through the booster, the brakes may be applied and locked before piston 70b moves far enough to close valve 83. On the other hand, if the booster leaks or by-passes to the reservoir substantial quantities of oil, piston 70b can move to the limit of its right ward travel and close valve 83. This action automatically isolates the booster from the brake cylinders. Once this happens, check valve 80 will open and allow the additional oil needed to fully apply the brakes to flow directly from line 23, 123a, 223a or 324a to the brake cylinder line 23c, 123, 223 or 324.

If the air brake is applied while the hand brake is set, the pressure in space 70c will rise to the output pressure of the booster and, if if this pressure is higher than the pressure in space 70a, piston 70b will move to the left until the pressures equalize or valve 83 opens. In either case, brake cylinder pressure will increase to the output level of the booster. If the hand brake is now released, the pressure in space 70c will move piston 70b to the left and cause it to displace oil from space 70a to the reservoir. Under this condition, the booster will discharge oil into space 70c. If, as mentioned earlier, the relative capacities of the booster and the dummy cylinder are properly correlated, the braking pressure will remain at the level called for by the air brake system.

It should be noted that, when the FIG. 15 scheme is used in the single line circuit of FIG. 10, the pressure in line 324a, and consequently in line 324, will rise to a level above the maximum output pressure of the booster during the initial stage of a hand brake release in order to effect charging of accumulator 382. During the following portion of the release cycle, when line 324a is vented to the reservoir, piston 70b will move to the left and the pressure in line 324 will decrease to the current output level of the booster. This decrease effects release of the hand brake lock. Thereafter, continued movement of piston 70b will enable the booster to discharge oil into chamber 70c and maintain braking pressure at the level required by the air brake system.

If the hand brake is released when the air brake is applied, valve 83 will necessarily be open, and, therefore, the oil delivered to space 70c by the booster can flow through the shut-off valve to the braking station. The output pressure established by the booster will apply the brakes and hold piston 70b in the illustrated retracted position. If the hand brake of FIGS. 2, 8 or 9 is then applied, piston 70b will move only slghtly to the right, if at all, because the brakes are already applied, but the lock will be moved to locking position. When the hand brake is subsequently released, the lock on each brake cylinder will be moved to unlocking position and, if piston 70b was moved to the right during the application, it will now return to the illustrated position. In the case of the FIG. 10 circuit, cycling of the hand brake will result in much greater movement of the piston 70b, and oil will actually be expelled from space 70c to the booster during application and then return to the dummy cylinder during release. Of course, braking pressure will be raised above the level called for by the air brake system during both application and release of the hand brake.

If the hand brake is applied while an air brake application is in effect, but is released after the air brake is released, the mode of operation is quite different. In this case, release of the air brake will cause the boster to retract and create a partial vacuum in space 70c. As a result, oil from the reservoir will flow into space 70a and shift piston 70b toward the right end of cylinder 70. (In the circuits of FIGS. 2, 8 and 9 the flow path to space 70a includes check valve 43, 143 or 243 and shuttle valve 38, 138 or 238, and in the circuit of FIG. 10 the flow path includes the path through check valves 343 and 375a, the parallel path through check valves 344 and 375b, common passage 375 and switching valve 366.) Although, under this circumstance, brake cylinder pressure will decrease to a low value, this is not important because the hand brake lock is set and will hold whatever braking force was in effect at the time the air brake was released. When the hand brake is finally released, and the cylinder locks are shifted to unlocking position, spring 84 and motor 85 will reopen valve 83 (assuming that it had been closed) and allow the oil expelled from the brake cylinders by their return springs to flow into space 70c. Piston 70b now moves to the left to the illustrated position thereby displacing oil from space 70a to the reservoir and permitting re-establishment of the desired shoe clearance.

From the preceding discussion, it should be evident that the desired shoe clearance will be developed when both the hand and air brakes are released, that neither brake will release the other, and that either brake will apply when the other is released.

The components 70, 80 and 83–85 shown schematically in FIG. 15 are preferably incorporated in the unitary assembly 90 depicted in FIG. 16. In this design, check valve 80 is defined by the packing carried by the left head 70d of the piston assembly 70b, and this valve is interposed in a by-pass path which connects space 70a with brake cylinder connection 70e and which includes piston chamber 70f, radial passages 70g formed in spacer 70h, and the radial and axial passages 70i and 70j, respectively, formed in rod 70k. Shut-off valve 83 is defined by an elastic O-ring 83a which is seated in a peripheral groove formed in rod 70k adjacent its right end, and which is adapted to move into and out of sealing engagement with the wall of the bore 83b which interconnects space 70c and connection 70e. Obviously the right end face of rod 70k serves as biasing motor 85. The device shown in FIG. 16 requires no separate lost motion connection corresponding to element 86 in FIG. 15 because the head of valve 83 is carried by piston assembly 70b.

Although I have described in detail various specific embodiments of the inventive concept, it will be understood that the following claims provide the real measure of the scope of the invention. In this connection, it should be noted that, because of space considerations, the broad, generic claims incorporate the reference numerals for only one of the specific embodiments which they cover.

I claim:

1. A hydraulic brake circuit comprising:
   (a) a manually operable, reversible, positive displacement hydraulic pump (37) having a pair of ports (37a, 37b) each of which serves alternatively as the inlet or discharge port;
   (b) a hydraulic brake motor means (25) having a working space and a movable member subject to the pressure in that space;
   (c) a lock (28) associated with the movable member of the brake motor and movable between locking and unlocking positons in which, respectively, it prevents and permits motion of that member in a direction to decrease the volume of the working space;
   (d) fluid pressure unlock motor means (33) arranged to shift the lock to unlocking position;

19

(e) fluid pressure lock motor means (31, 32) arranged to shift the lock to locking position;
(f) first means (23, 24, 36, 38, 43, 44) effective when the pump is operated in one sense to supply fluid to its first port (37b), and to utilize fluid discharged from the second port (37a) to energize the lock and brake motor means; and
(g) second means (23, 24, 36, 38, 43, 44) effective when the pump is operated in the opposite sense to supply fluid to its second port (37a), and to utilize fluid discharge from the first port (37b) to energize the unlock motor means.

2. The brake circuit defined in claim 1 in which the hydraulic pump (37) is a gear pump having relatively high internal slippage, and it is driven through a step-up gear train (42).

3. The brake circuit defined in claim 1 in which the pump (37') is of the variable displacement type and includes a discharge pressure compensator (662–64) that varies its displacement in inverse relation to the pressure at the second port (37a').

4. The brake circuit defined in claim 1 in which the pump (37') is of the variable displacement type and includes a discharge pressure compensator (62–65) that varies its displacement in inverse relation to the pressure at whichever of its two ports (37a', 37b') is the discharge port.

5. The brake circuit defined in claim 1 which includes indicating means (47, 49, 51, 54) which responds to the pressures in the lock and unlock motor means and indicates the condition of the lock.

6. The brake circuit defined in claim 5 in which the indicating means provides visual indications of both the locking and unlocking positions.

7. The brake circuit defined in claim 5 in which the indicating means comprises a valve (51a, 54) which vents the pressure at said first pump port (37b) after that pressure has reached a predetermined level.

8. The brake circuit defined in claim 1 which includes:
(a) an unloading valve (51a, 54) shiftable between first and second positions in which, respectively, it opens and closes a connection between said first pump port (37b) and a hydraulic reservoir (36); and
(b) first (51) and second (49) opposed, fluid pressure indicator motors for shifting the unloading valve, the first indicator mtor (51) being arranged to shift the valve toward the first position and being connected with the unlock motor means (33) and the second indicator motor (49) being connected with the lock motor means (31, 32).

9. The brake circuit defined in claim 8 which includes:
(a) a visual indicator (47) operated in unison with the unloading valve and serving to indicate that the lock is in the unlocking and locking positions, respectively, when the unloading valve is in said first and second positions;
(b) a check valve (52) in the connection between the second indicator motor (49) and the lock motor means (31, 32) and oriented to block flow from the indicator motor; and
(c) conduit means containing a relief valve (53) connecting the second indicator motor (49) with said reservoir (36).

10. The brake circuit defined in claim 9 in which the effective area of the first indicator motor (51) is greater than the effective area of the second indicator means (49).

11. The brake circuit defined in claim 1 which includes a detent device (35) for yieldingly holding the lock in each of its two positions.

12. The brake circuit defined in claim 11 in which:
(a) the lock and unlock motor means include motors (32, 33) which act in opposition to each other on a

20 member (34) which is mounted for movement in a casing containing the lock (28) and is arranged to shift the lock to unlocking position;
(b) the lock motor means includes a spring (31) reacting between the lock and the casing and urging the lock to locking position; and
(c) the detent device is a Belleville washer (35) having inner and outer peripheral portions which are held captive in said member (34) and the casing.

13. The brake circuit defined in claim 11 in which
(a) the lock and unlock motor means include motors (32', 33') which act in opposition to each other on a member (34') which is mounted for movement in a casing containing the lock (28') and is arranged to shift the lock to unlocking position;
(b) the lock motor means includes a spring (31') reacting between said member (34') and the lock and urging the latter to follow movement of the member under the action of the lock motor; and
(c) the detent device (35') is a spring biased ball detent reacting between said member and casing.

14. The brake circuit defined in claim 1 which includes a manually operable, mechanical actuator (30) for moving the lock (28) from its locking to its unlocking position.

15. The brake circuit in claim 1 in which said first and second means comprise:
(a) a fluid reservoir (36);
(b) a shuttle valve (38) connected with the pump, the reservoir, and the brake, lock and unlock motor means and shiftable between a first position in which it connects the first pump port (37b) with the unlock motor means and connects the lock and brake motor means with the reservoir, and a second position in which it connects the second pump port (37a) with the lock and brake motor means and connects the unlock motor means with the reservoir; and
(c) a pair of opposed fluid pressure valve motors (45, 46) arranged to shift the shuttle valve (38) between said first and second positions, the first valve motor (46) being connected with the first pump port (37b) and arranged to shift the valve toward the first position and the second valve motor (45) being connected with the second pump port (37a).

16. The brake circuit defined in claim 15 including:
(a) a source (56) of hydraulic fluid adapted to produce a variable output pressure;
(b) a double check valve (55) interposed in the connection between the shuttle valve (38) and the brake motor means (25) and shiftable between positions in which it connects that motor means with the shuttle valve and the source, respectively; and
(c) means responsive to the difference between the pressures of the fluid delivered to the double check valve (55) by the shuttle valve and the source for shifting the double check valve.

17. The brake circuit defined in claim 15 including:
(a) a source (56) of hydraulic fluid adapted to produce a variable output pressure;
(b) a double-acting hydraulic motor (50, 70) interposed in the connection between the shuttle valve (38) and the brake motor means (25), the motor (50, 70) having one working space (50a, 70a) connected with the shuttle valve (38), an opposed working space (50c, 70c) connected with both the source (56) and the brake motor means (25), and a movable member (50b, 70b) shiftable in response to the difference between the pressures in said spaces; and
(c) a by-pass check valve (60, 80) connected between said one working space (50a, 70a) and the brake motor means (25) and serving to permit flow toward the motor means (25) upon the occurrence of a predetermined pressure differential.

18. The brake circuit defined in claim 17 in which said opposed working space (50c) is in continuous communication with both the source (56) and the brake motor means (25).

19. The brake circuit defined in claim 17 in which:
(a) said opposed working space (70c) is in continuous communication with the source (56); and
(b) the connection between said opposed working space (70c) and the brake motor means (25) includes a shut-off valve (83),
(c) the shut-off valve being urged open by biasing means (84, 85) and being closed by the movable member (70b) as the latter approaches a limit of movement in a direction which effects contraction of said opposed working space (70c).

20. The brake circuit defined in claim 19 in which said biasing means for the shut-off valve comprises a spring (84), and a fluid pressure motor (85) which responds to the pressure in the brake motor means (25).

21. The brake circuit defined in claim 1 in which said first and second means include:
(a) a fluid reservoir (36);
(b) a shuttle valve (38') connected with the second pump port (37a), the reservoir and the brake and lock motor means and shiftable between a first position in which it connects said motor means with the reservoir and a second position in which it connects said motor means with the second pump port;
(c) a check valve (61) interposed in the connection between the shuttle valve and the second pump port for blocking reverse flow from the valve to the port;
(d) conduit means connecting the first pump port (37b) with the unlock motor means; and
(e) a pair of opposed fluid pressure valve motors (45', 46') arranged to shift the shuttle valve between said first and second positions, the first valve motor (46') being connected with the first pump port (37b) and arranged to shift the valve toward the first position and the second valve motor (45') being connected with the second pump port (37a).

22. The brake circuit defined in claim 1 in which said first and second means include:
(a) a fluid reservoir (36);
(b) a shuttle valve (38') connected with the second pump port (37a), the reservoir and the brake and lock motor means and shiftable between a first position in which it connects said motor means with the reservoir and a second position in which it connects said motor means with the second pump port;
(c) a check valve (61) interposed in the connection between the shuttle valve and the second pump port (37a) for blocking reverse flow from the valve to the port;
(d) conduit means connecting the first pump port (37b) with the unlock motor means;
(e) means (59) biasing the shuttle valve toward the second position; and
(f) a fluid pressure valve motor (46') connected with the first pump port (37b) and arranged to shift the shuttle valve to the first position.

23. The brake circuit defined in claim 1 in which the first and second means include:
(a) means (123, 124, 138, 166) for delivering fluid from the second pump port (137a) to the brake motor means (125) during an initial stage of operation of the pump (137) in said one sense and for delivering fluid from the second port to both the brake motor means and the lock motor means (132) as the pump continues to operate in said one sense; and
(b) means (123, 124, 138, 166, 167) for delivering fluid from the first pump port (137b) to the unlock motor means (133) and for connecting the brake motor means (125) and the lock motor means (132) with a reservoir (136) during an initial stage of operation of the pump (137) in said opposite sense, and for connecting the lock and unlock motor means and the brake motor means with the reservoir as operation in said opposite direction continues.

24. The brake circuit defined in claim 23 in which the means of clause (b) includes means (151a, 154) which unloads the pump to the reservoir during said continued operation in said opposite direction.

25. The brake circuit defined in claim 1 in which the first and second means include:
(a) a fluid reservoir (136);
(b) a first passage (123) connected with the brake motor means (125);
(c) a shuttle valve (138) connected with the pump, the reservoir, the first passage and a second passage (124a) and shiftable between a first position in which it connects the first and second passages with the reservoir and the first pump port (137b), respectively, and a second position in which it connects the first passage with both the second passage and the second pump port (137a);
(d) motor means (145, 146) responsive to the difference between the pressures at the pump ports for shifting the shuttle valve to its first position when the first port is at the higher pressure and for shifting the shuttle valve to its second position when the second port is at the higher pressure;
(e) a switching valve (166) connected with the reservoir, the second passage and a third passage (124) and shiftable between a first position in which it connects the third passage with the reservoir, and a second position in which it connects the third passage with the second passage (124a);
(f) a pair of opposed, fluid pressure switching valve motors (149, 151) of different effective areas, the first (149) having the larger area, being connected with the first passage (123) and serving to shift the switching valve towards its second position, and the second (151) being connected with the second passage (124a);
(g) a second shuttle valve (167) connected with the first (123) and third (124) passages and the lock and unlock motor means and shiftable between a first position in which it connects the unlock motor means (133) with the first passage (123) through a check valve (168) oriented to block flow to the motor means and connects the third passage (124) with the lock motor means (132), and a second position in which it connects the unlock motor means (133) with the third passage (124) and connects the lock motor means (132) with the first passage (123);
(h) means (167a) biasing the second shuttle valve (167) toward its first position; and
(i) motor means (167b, 167c) responsive to the difference between the pressures in the first and third passages (123, 124) for shifting the second shuttle valve (167) to its second position when the third passage (124) is at the higher pressure.

26. The brake circuit defined in claim 25 in which the switching valve (166) also connects the second passage (124a) with the reservoir (136) when in its first position.

27. The brake circuit defined in claim 26 in which:
(a) the first switching valve motor (149) is connected with the first passage (123) through a check valve (152) oriented to prevent flow from the motor; and
(b) the first switching valve motor (149) is connected with the reservoir (136) through a relief valve (153).

28. The brake circuit defined in claim 27 including a visual indicator (147) connected to move with the switching valve (166) and serving to indicate the condition of the lock (128).

29. The brake circuit defined in claim 25 including:
(a) a source (156) of hydraulic fluid adapted to produce a variable output pressure;
(b) a double check valve (155) interposed in the first passage and dividing said passage into a first portion (123a) extending between the check valve (155) and the shuttle valve (138) and a second portion (123) extending between the check valve and the brake motor means (125), the double check valve being shiftable between positions in which it connects the second portion (123) with the first portion (123a) and the source (156), respectively, and
(c) means responsive to the difference between the output pressure of the source and the pressure in said first portion (123a) of the first passage for shifting the double check valve.

30. The brake circuit defined in claim 25 including:
(a) a source (156) of hydraulic fluid adapted to produce a variable output pressure;
(b) a double-acting hydraulic motor (150, 70) interposed in the first passage and having one working space (150a, 70a) connected with the shuttle valve (138), an opposed working space (150c, 70c) connected with both the source (156) and the brake motor means (125), and a movable member (150b, 70b) shiftable in response to the difference between the pressures in said spaces; and
(c) a by-pass check valve (160, 80) connected between said one working space (150a, 70a) and the brake motor means (125) and serving to permit flow toward the motor means upon the occurrence of a predetermined pressure differential.

31. The brake circuit defined in claim 30 in which said opposed working space (150c) is in communication with both the source (156) and the brake motor means (125).

32. The brake circuit defined in claim 30 on which:
(a) said opposed working space (70c) is in continuous communication with the source (156); and
(b) the connection between said opposed working space (70c) and the brake motor means (125) includes a shut-off valve (83),
(c) the shut-off valve being urged open by biasing means (84, 85) and being closed by the movable member (70b) as the latter approaches a limit of movement in a direction which effects contraction of said opposed working space (70c).

33. The brake circuit defined in claim 32 in which said biasing means for the shut-off valve comprises a spring (84), and a fluid pressure motor (85) which responds to the pressure in the brake motor means (125).

34. The brake circuit defined in claim 1 in which the unlock motor means (233) has a greater effective area than the lock motor means (232) and in which the first and second means comprise:
(a) means (223, 224, 238, 269) for delivering fluid at the full output pressure of the pump from the second pump port (237a) to the brake motor means (225) and for delivering fluid at a lesser pressure from the second port to the lock motor means (232) during operation of the pump in said one sense; and
(b) means (223, 224, 238, 266, 272, 272a) for delivering fluid from the first pump port (237b) to both the lock and unlock motor means (232, 233) and for connecting the brake motor means with a reservoir (236) during an initial stage of operation of the pump in said opposite sense, and for connecting the lock, unlock and brake motor means with the reservoir as the pump continues to operate in said opposite sense.

35. The brake circuit defined in claim 34 in which the means of clause (b) includes means (254) which unloads the pump to the reservoir (236) during said continued operation in said opposite direction.

36. The brake circuit defined in claim 1 in which the unlock motor means (233) has a greater effective area than the lock motor means (232) and is provided with a return spring (233a); and in which said first and second means comprise:
(a) first and second passages (223, 224) connected, respectively, with the brake (225) and lock (232) motor means;
(b) a shuttle valve (238) connected with the pump, the first and second passages, three other passages and a reservoir (236) and shiftable between a first position in which it connects the first passage (223) with the reservoir, interconnects the second (224) and third (224b) passages, and connects the fourth passage (251b) with the first pump port (237b), and a second position in which it connects the first passage (223) with the second pump port (237a), interconnects the second (224) and fifth (224a) passages, and connects the fourth passage (251b) with the reservoir;
(c) a pressure-limiting valve (269) interposed in a connection between the fifth passage (224a) and the second pump port (237a) and operable to close said connection when the pressure in the fifth passage exceeds a predetermined value;
(d) motor means (245, 246) responsive to the difference between the pressures at the pump ports for shifting the shuttle valve (238) to its first position when the first port is at the higher pressure and for shifting the shuttle valve to its second position when the second port is at the higher pressure;
(e) a switching valve (266) connected with the reservoir (236), the first pump port (237b) and the third passage (224b) and shiftable between first and second positions in which, respectively, it connects the third passage (224b) with the reservoir and the first pump port;
(f) a pair of opposed, fluid pressure switching valve motors (249, 251), the first (249) being connected with the second pump port (237a) and urging the switching valve (266) toward its second position, and the second (251) being connected with the fourth passage (251b);
(g) a relief valve (273) normally closing a connection between the second passage (224) and the unlock motor means (233) but adapted to open that connection when the pressure in the second passage exceeds a value higher than said predetermined value; and
(h) a connection (272) between the unlock motor means (233) and the second passage (224) containing a check valve (272a) oriented to prevent flow from the passage to the motor means.

37. The brake circuit defined in claim 36 in which the switching valve (266) also connects the fourth passage (251b) with the reservoir (236) when in its first position.

38. The brake circuit defined in claim 37 in which the first switching valve motor (249) is connected with the second pump port (237a) through a check valve (252) oriented to block flow from the motor, and is connected with the reservoir (236) through a relief valve (253).

39. The brake circuit defined in claim 38 including a visual indicator (247) connected to move with the switching valve (266) and serving to display the condition of the lock (228).

40. The brake circuit defined in claim 36 including:
(a) a source (256) of hydraulic fluid adapted to produce a variable output pressure;
(b) a double check valve (255) interposed in the first passage and dividing said passage into a first portion (223a) extending between the check valve and the shuttle valve (238) and a second portion (223) extending between the check valve and the brake motor means (225), the double check valve being shiftable between positions in which it connects the second portion (223) with the first portion (223a) and the source (256), respectively; and (c) means responsive to the difference between the output pressure of the source and the pressure in said first portion (223a) for shifting the double check valve.

41. The brake circuit defined in claim 36 including:

(a) a source (256) of hydraulic fluid adapted to produce a variable output pressure;

(b) a double-acting hydraulic motor (250, 70) interposed in the first passage and having one working space (250a, 70a) connected with the shuttle valve (238), an opposed working space (250c, 70c) connected with both the source (256) and the brake motor means (225), and a movable member (250b, 70b) shiftable in response to the difference between the pressures in said spaces; and (c) a by-pass check valve (260, 80) connected between said one working space (250a, 70a) and the brake motor means (225) and serving to permit flow toward the motor means upon the occurrence of a predetermined pressure differential.

42. The brake circuit defined in claim 41 in which said opposed working space (250c) is in continuous communication with both the source (256) and the brake motor means (225).

43. The brake circuit defined in claim 41 in which:

(a) said opposed working space (70c) is in continuous communication with the source (256); and (b) the connection between said opposed working space (70c) and the brake motor means (225) includes a shut-off valve (83), (c) the shut-off valve being biased open by means (84, 85) and being closed by the movable member (70b) as the latter approaches a limit of movement in a direction which effects contraction of said opposed working space (70c).

44. The brake circuit defined in claim 43 in which said biasing means for the shut-off valve comprises a spring (84), and a fluid pressure motor (85) which responds to the pressure in the brake motor means (225).

45. The brake circuit defined in claim 1 in which the lock motor means (332) has a greater effective area than the unlock motor means (333) and said first and second means comprise:

(a) means (324, 338, 366, 374, 376) for delivering fluid at a pressure above a predetermined level from the second pump port (337a) to the brake (325), lock (332) and unlock (333) motor means when the pump (337) is operated in said one sense; and (b) means (324, 338, 366, 374, 376–379, 381, 382) for delivering fluid at a pressure above said level from the first pump port (337b) to brake, lock and unlock motor means during an initial stage of operation of the pump in said opposite sense, and for releasing the pressure in the lock and brake motor means at one rate and releasing the pressure in the unlock motor means at a slower rate during continued operation of the pump in said opposite direction.

46. The brake circuit defined in claim 1 in which the lock motor means (332) has a greater effective area than the unlock motor means (333), and said first and second means comprise:

(a) a shuttle valve (338) connected with a reservoir (336) and three passages and shiftable between a first position in which it interconnects the first and second passages and connects the third passage with the reservoir, and a second position in which it interconnects the first and third passages and connects the second passage with the reservoir;

(b) a fourth passage (375) connected with each of the pump ports (337a, 337b) through a check valve (375a, 375b) oriented to prevent reverse flow from the passage to the port;

(c) a relief valve (374) normally blocking a connection between the first and fourth passages but adapted to open said connection as the pressure in the fourth passage (375) rises above a predetermined value;

(d) motor means (345, 346) responsive to the pressures at the pump ports for shifting the shuttle valve (338) to its first position when the first port is at the higher pressure and for shifting the shuttle valve to its second position when the second port is at the higher pressure;

(e) a switching valve (366) connected with the reservoir (336), the fourth passage (375), and with a fifth passage (324) which leads to the brake motor means, the switching valve being shiftable between first and second positions in which it connects the fifth passage (324) with the reservoir (336) and the fourth passage (375), respectively;

(f) a pair of opposed, fluid pressure switching valve motors (349, 351), the first (349) being connected with the third passage and arranged to shift the switching valve (366) toward the second position, and the second (351) being connected with the second passage;

(g) a pressure accumulator (382) in free, constant communication with the unlock motor means (333);

(h) a second relief valve (376) having an outlet passage (378) connected with the lock and unlock motor means (332, 333) and being adapted to open a connection between this outlet passage and the fifth passage (324) when the pressure in the latter exceeds a predetermined value;

(i) a one-way flow restrictor (379, 381) interposed in the connection between the unlock motor means (333) and the outlet passage (378) and arranged to permit free flow toward the motor means and restricted flow in the opposite direction; and (j) a passage interconnecting the outlet (378) and fifth (324) passages and containing a check valve (377) oriented to block flow from the fifth passage to the outlet passage.

47. The brake circuit defined in claim 46 in which the switching valve (366), when in its first position, also connects the second passage with the reservoir.

48. The brake circuit defined in claim 47 including a visual indicator (347) connected to move with the switching valve (366) and display the condition of the lock (328).

49. The brake circuit defined in claim 46 including (a) a source (356) of hydraulic fluid adapted to produce a variable output pressure having a maximum value less than said predetermined value;

(b) a double check valve (355) interposed in the fifth passage and dividing said passage into a first portion (324a) extending between the double check valve and the switching valve (366) and a second portion (324) extending between the double check valve and the brake motor means (325), the double check valve being shiftable between positions in which it connects the second portion (324) with the first portion (324a) and the source (356), respectively; and (c) means responsive to the difference between the output pressure of the source (356) and the pressure in said first portion (324a) for shifting the double check valve.

50. The brake circuit defined in claim 46 including:

(a) a source (356) of hydraulic fluid adapted to produce a variable output pressure having a maximum value less than said predetermined value;

(b) a double-acting hydraulic motor (350, 70) interposed in the fifth passage and having one working space (350a, 70a) connected with the switching valve (366), an opposed working space (350c, 70c) connected with both the source (356) and the brake motor means (325), and a movable member (350b, 70b) shiftable in response to the difference between the pressures in said spaces; and (c) a by-pass check valve (360, 80) connected between said one working space (350a, 70a) and the brake motor means (325) and serving to permit flow toward the motor means upon the occurrence of a predetermined pressure differential.

51. The brake circuit defined in claim 50 in which said opposed working space (350c) is in continuous communication with both the source (356) and the brake motor means (325).

52. The brake circuit defined in claim 50 in which:
(a) said opposed working space (70c) is in continuous communication with the source (356); and
(b) the connection between said opposed working space (70c) and the brake motor means includes a shut-off valve (83),
(c) the shut-off valve being urged open by biasing means (84, 85) and being closed by the movable member (70b) as the latter approaches a limit of movement in a direction which effects contraction of said opposed working space (70c).

53. The brake circuit defined in claim 52 in which said biasing means for the shut-off valve comprises a spring (84), and a fluid pressure motor (85) which responds to the pressure in the brake motor means (325).

References Cited

UNITED STATES PATENTS

| | | | |
|---|---|---|---|
| 3,037,819 | 6/1962 | Sukala | 303—89 |
| 3,176,590 | 4/1965 | Uhtenwoldt | 188—67 X |
| 3,359,862 | 12/1967 | Modrich | 91—44 X |

MILTON BUCHLER, Primary Examiner

J. J. McLAUGHLIN, Jr., Assistant Examiner

U.S. Cl. X.R.

60—52; 91—44; 188—265; 303—89